(12) United States Patent
Nakamura

(10) Patent No.: US 8,725,827 B2
(45) Date of Patent: May 13, 2014

(54) DATA COMMUNICATION SYSTEM AND DATA COMMUNICATION APPARATUS IN A TOKEN PASSING SYSTEM WITH IMPROVED RECOVERY

(75) Inventor: Masato Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 333 days.

(21) Appl. No.: 13/131,293

(22) PCT Filed: Dec. 25, 2008

(86) PCT No.: PCT/JP2008/073645
§ 371 (c)(1),
(2), (4) Date: May 26, 2011

(87) PCT Pub. No.: WO2010/073352
PCT Pub. Date: Jul. 1, 2010

(65) Prior Publication Data
US 2011/0238773 A1    Sep. 29, 2011

(51) Int. Cl.
*H04L 12/403*    (2006.01)
*H04L 12/433*    (2006.01)

(52) U.S. Cl.
USPC ............ 709/208; 709/238; 709/251; 370/450

(58) Field of Classification Search
USPC .......................... 709/208, 251, 238; 370/340
See application file for complete search history.

(56) References Cited

U.S. PATENT DOCUMENTS

| | | | | |
|---|---|---|---|---|
| 8,452,843 B2 * | 5/2013 | Yabusaki et al. | ............ | 709/208 |
| 2006/0282506 A1 * | 12/2006 | Furuishi et al. | ............ | 709/208 |
| 2007/0053375 A1 * | 3/2007 | Kurosawa | ............ | 370/450 |
| 2007/0147232 A1 * | 6/2007 | Takehara et al. | ............ | 370/217 |
| 2009/0119437 A1 * | 5/2009 | Hilscher | ............ | 710/305 |
| 2011/0093559 A1 * | 4/2011 | Yabusaki et al. | ............ | 709/208 |
| 2011/0255549 A1 * | 10/2011 | Nakamura et al. | ............ | 370/401 |
| 2012/0005296 A1 * | 1/2012 | Lint et al. | ............ | 709/208 |
| 2012/0082170 A1 * | 4/2012 | Nakamura et al. | ............ | 370/452 |

FOREIGN PATENT DOCUMENTS

| | | | |
|---|---|---|---|
| JP | 63-267039 A | 11/1988 |
| JP | 08-079283 A | 3/1996 |
| JP | 08-125671 A | 5/1996 |
| JP | 09130415   | 5/1997 |
| JP | 09-160851 A | 6/1997 |
| JP | 2003-304271 A | 10/2003 |
| JP | 2005-159920 A | 6/2005 |

OTHER PUBLICATIONS

Japanese Office Action dated Nov. 15, 2011 in the corresponding Japanese Patent Application No. 2010-543688.
Japanese Office Action, Mar. 5, 2013; Patent Application No. 2012-004160.

* cited by examiner

*Primary Examiner* — Alina N Boutah
(74) *Attorney, Agent, or Firm* — Sughrue Mion, PLLC

(57) ABSTRACT

In a data communication system that performs data communication between a master station and slave stations in a token passing system employing an Ethernet (registered trademark), when a communication processing unit of a master station subjects processing for circulating a token frame between the master station and slave stations and receiving data from the slave stations to retry processing, the communication processing unit subjects the processing to the retry processing without transferring data received from the slave stations to a data processing unit that performs transmission and reception of data between the data processing unit and an arithmetic processing device.

20 Claims, 19 Drawing Sheets

101

| SLAVE STATION | FIRST TIME | SECOND TIME | ... | xTH TIME |
|---|---|---|---|---|
| SL1 | OK | NG | ... | NG |
| SL2 | NG | OK | ... | OK |
| SL3 | NG | NG | ... | OK |
| ⋮ | ⋮ | ⋮ | ... | ⋮ |
| SLn | OK | OK | ... | OK |

DATA COMMUNICATION SYSTEM AND DATA COMMUNICATION APPARATUS IN A TOKEN PASSING SYSTEM WITH IMPROVED RECOVERY

CROSS REFERENCE TO RELATED APPLICATION

This application is a National Stage of International Application No. PCT/JP2008/073645 filed Dec. 25, 2008, the contents of all of which are incorporated herein by reference in their entirety.

TECHNICAL FIELD

The present invention relates to a data communication system and a data communication apparatus that perform data communication between a master station and slave stations in a token passing system employing an Ethernet (registered trademark).

BACKGROUND ART

In a manufacturing site such as a factory, a communication system is configured by connecting field apparatuses such as a PLC (Programmable Logic Controller), an inverter, and a thermometer. Various kinds of processing are performed while data communication is performed among the field apparatuses. In such a communication system, to guarantee a real-time property of the data communication performed among the field apparatuses, a token passing system employing a LAN (Local Area Network) standard of an Ethernet (registered trademark) technology or the like is adopted. However, in the communication system in which the field apparatuses are connected, data transferred among the field apparatuses tend to be affected by noise. Therefore, in the communication system in which the data communication is performed among the field apparatuses, it is desired to improve noise resistance and efficiently transmit data.

For example, in a data communication control system disclosed in Patent Document 1, frame length used for data transfer is set short. When a bit error occurs in a data transfer frame, a short frame in which the bit error occurs is retransmitted. This makes it possible to suppress a data amount to be retransmitted and improve efficiency of the data transfer.

Patent Document 1: Japanese Patent Application Laid-Open No. H09-160851

DISCLOSURE OF INVENTION

Problem to be Solved by the Invention

However, when the technology in the past is applied to the field apparatuses, there is a problem in that processing in the data transfer increases and the real time property of the data communication performed among the field apparatuses is lost. In particular, in the case of the token passing system, because a frame can be transmitted only when a transmission right is token-received, when the technology in the past is directly applied, performance deterioration increases. Therefore, the technology in the past cannot be directly applied to the data communication among the field apparatuses.

The present invention has been devised in view of the above and it is an object of the present invention to obtain a data communication system and a data communication apparatus that improve noise resistance while guaranteeing a real time property and efficiently perform data communication.

Further, it is an object of the present invention to obtain a data communication system and a data communication apparatus that can particularly efficiently perform data communication in the case of the token passing system.

Means for Solving Problem

In order to solve the above problem and in order to attain the above object, in a data communication system of the present invention that performs data communication between a master station and a plurality of slave stations in a token passing system employing an Ethernet (registered trademark), the master station includes: a communication processing unit that performs, as first data transmission and reception processing, data transmission and reception between the master station and the slave stations performed by circulating a token frame between the master station and the slave stations; and a data transmission and reception processing unit that is connected to an arithmetic processing device and performs, as second data transmission and reception processing, data transmission and reception performed between the arithmetic processing device and the communication processing unit, the arithmetic processing device subjecting data transmitted from the slave station to arithmetic processing and generating data transmitted to the slave station. Additionally, the communication processing unit performs, as third data transmission and reception processing, data transmission and reception performed between the communication processing unit and the data transmission and reception processing unit and, when data reception processing for circulating the token frame between the master station and the slave stations and receiving the data from the slave stations in the first data transmission and reception processing is subjected to retry processing, after performing the first data transmission and reception processing, circulates the token frame between the master station and the slave stations and receives the data from the slave stations without performing the third data transmission and reception processing to thereby subject the processing to the retry processing, and performs the third data transmission and reception processing after the retry processing.

Effect of the Invention

In the data communication system according to the present invention, when the master station performs the retry processing of the data reception processing between the master station and the slave stations, the master station circulates the token frame and receives data from the slave stations without performing the third data transmission and reception processing between the slave stations and the communication processing unit. Therefore, there is an effect that it is possible to improve noise resistance while guaranteeing a real time property of data transmission and reception performed between the master station and the slave stations and efficiently perform data communication.

EXPLANATIONS OF LETTERS OR NUMERALS

Figure 1:
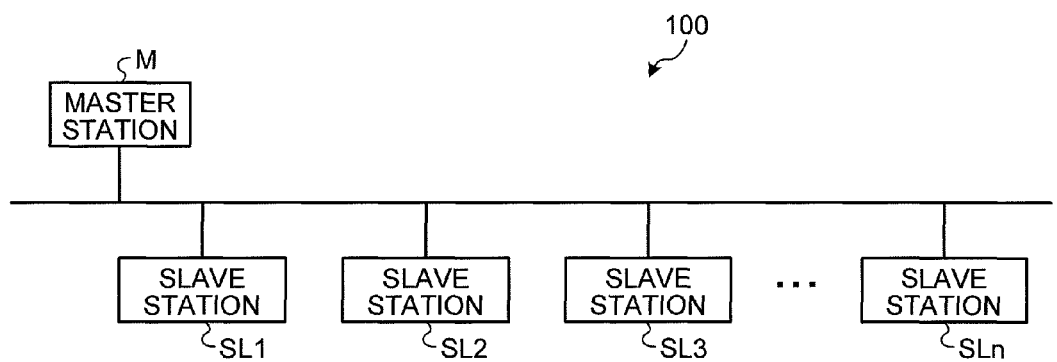
FIG. 1 is a diagram of the configuration of a data communication system according to a first embodiment.

1 CPU
2 data processing unit
3M communication processing unit
4 memory
7 data input and output unit
10 PLC
20 switching hub
31, 71 transmission buffers
32, 72 reception buffers
33 instruction input unit
35 setting switching unit
37 number-of-times-of-transmission setting unit
41 token setting unit
42 token reissue unit
43 number-of-times-of-issuance determining unit
44 monitoring timer
45 counter
46 reference-value storing unit
47 determining unit
48 lost-token determining unit
51 update instructing unit
52 determination circuit
53 register reset unit
54 register-reset determining unit
56 SA determining unit
57 TF determining unit
61 division processing unit
62 assembly processing unit
70S communication processing unit
73 number-of-times-of-data-transmission control unit
74 token-transmission control unit
75 data dividing unit
76 sequential-No giving unit
77 end-flag setting unit
80X to 83X shared memories
91 sequential No register
92 end flag register
100 data communication system
101 reception state information table
M master station
SL1 to SLn slave stations

BEST MODE(S) FOR CARRYING OUT THE INVENTION

Embodiments of a data communication system and a data communication apparatus according to the present invention are explained in detail below with reference to the drawings. The present invention is not limited by the embodiments.

First Embodiment.

FIG. 1 is a diagram of the configuration of a data communication system according to a first embodiment. A data communication system 100 includes a master station M and one or a plurality of slave stations SL1 to SLn (n is a natural number). In the data communication system 100, the master station M and the slave stations SL1 to SLn are connected on a transmission line (a bus) and perform data communication one another via the transmission line.

The data communication system 100 according to this embodiment realizes cyclic communication using a token passing system employing a LAN standard of an Ethernet (registered trademark) technology or the like and performs data communication (transmission and reception of an Ethernet (registered trademark) frame) between the stations (the master station M and the slave stations SL1 to SLn). Consequently, a real time property of data communication (timing of data exchange) performed in a transmission line is guaranteed.

The master station M and the slave stations SL1 to SLn are field apparatuses or the like that require a real time property of data communication. The master station M and the slave stations SL1 to SLn are data communication apparatuses that realize cyclic communication using the token passing system. The master station M is a network unit disposed in a PLC (Programmable Logic Controller) 10 explained later. The master station M performs data communication with the slave stations SL1 to SLn. The slave stations SL1 to SLn are respectively disposed in peripheral devices (not shown) such as an IO device and a digital/analog converter. The slave stations SL1 to SLn transmit an operation instruction and the like, which are received from the master station M, to these peripheral devices.

In the data communication system 100, data of the PLC 10 is transmitted from the master station M to the slave stations SL1 to SLn. The slave stations SL1 to SLn cause peripheral devices to operate using the data received from the master station M. The slave stations SL1 to SLn transmit data acquired from the peripheral devices, to which the slave stations SL1 to SLn are respectively connected, to the master station M. The PLC 10 performs a predetermined arithmetic operation using data received from the slave stations SL1 to SLn and generates data to be transmitted to the slave stations SL1 to SLn. The PLC 10 transmits the generated data from the master station M to the slave stations SL1 to SLn. The data communication system 100 operates by repeating such data communication processing performed between the master station M and the slave stations SL1 to SLn.

In the data communication system 100, it is set in advance in which order a token frame (hereinafter referred to as "TF") flows among the slave stations SL1 to SLn. When a communication apparatus (each of the slave stations SL1 to SLn and the master station M) in the data communication system 100 receives a TF, the communication apparatus (the station) recognizes that the station acquires a transmission right and, after transmitting data of the station according to necessity, issues the TF and designates the next transmission station. In the data communication system 100, the stations carry out this operation and the TF circulates in the data communication system 100, whereby a congestion state of frames on the transmission line is prevented and a real time property of data communication is guaranteed. The master station M receives the TF to thereby recognize that the master station M receives data from the slave stations SL1 to SLn and executes reception processing (firmware processing) or the like for the data. The firmware processing (hereinafter referred to as "F/W processing") is processing concerning transmission and reception of the data in the master station M. After executing the F/W processing, the master station M starts data transmission to the slave stations SL1 to SLn to thereby take timing for the data communication between the master station M and the slave stations SL1 to SLn.

If the master station M carries out the reception processing at every timing of data reception from the slave stations SL1 to SLn rather than at timing for receiving a TF, compared with time for collectively processing reception data from all the slave stations SL1 to SLn, excess time is required for DMA (Direct Memory Access) transfer in the master station M and performance is deteriorated. On the other hand, in this embodiment, efficiency of data transmission and reception is realized by collectively processing reception data from all the slave stations SL1 to SLn. The master station M according to this embodiment can carry out other processing in a period from the master station M issues a TF and until the TF returns to the master station M. Therefore, processing efficiency of the entire system is improved.

Figure 2:
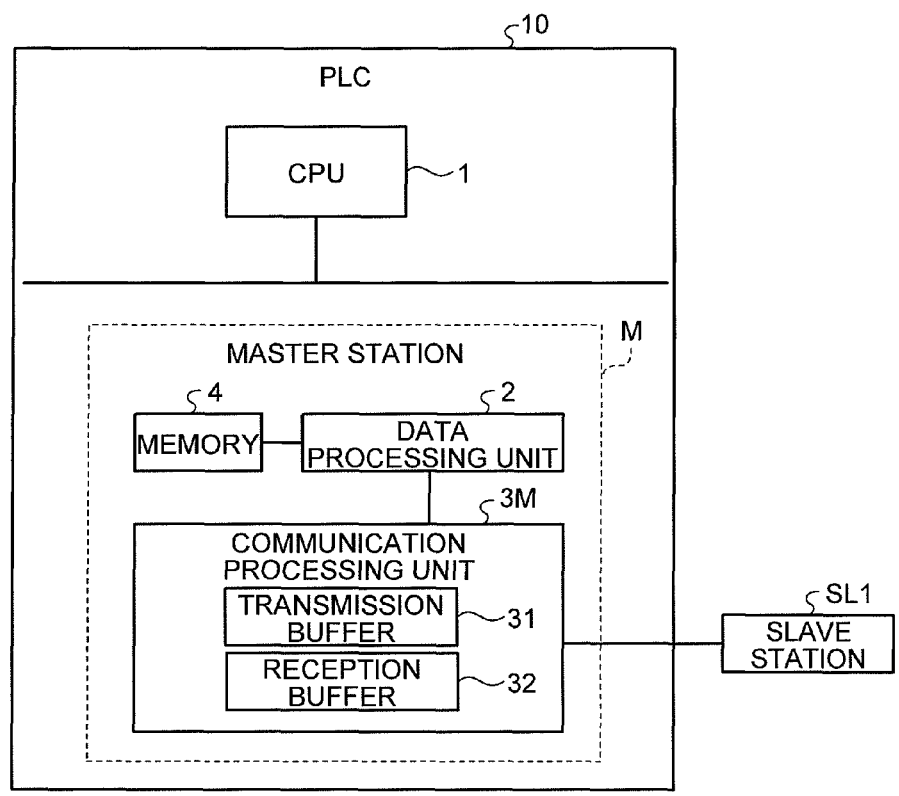
FIG. 2 is a block diagram of the configuration of a PLC.

FIG. 2 is a block diagram of the configuration of the PLC. In FIG. 2, only the slave station SL1 is shown as a slave station connected to the master station M. As shown in the figure, the PLC 10 includes a CPU (Central Processing Unit) 1 serving as an arithmetic processing device and the master station M. The master station M includes a data processing unit 2, a communication processing unit 3M, and a memory 4. The master station M is configured by using, for example, an ASIC (Application Specific Integrated Circuit) or a microcomputer.

The CPU 1 is connected to the master station M and performs data communication between the CPU 1 and the master station M. The CPU 1 transmits data (e.g., data for controlling peripheral devices), which is transmitted to the slave stations SL1 to SLn, to the data processing unit 2 of the master station M. The CPU 1 receives, from the data processing unit 2, data from the slave stations SL1 to SLn received by the master station M.

The data processing unit (a data transmission and reception processing unit) 2 of the master station M performs data relay (second data transmission and reception processing) between the CPU 1 and the communication processing unit 3M. In other words, the data processing unit 2 sends data received from the CPU 1 to the communication processing unit 3M and sends data received from the communication processing unit 3M to the data processing unit 2. The data processing unit 2 of the master station M divides data received from the CPU 1 into data (packets) of a predetermined size and sends the data to the communication processing unit 3M. The data processing unit 2 integrates data received from the communication processing unit 3M into data of a predetermined size and sends the data to the CPU 1.

The communication processing unit 3M performs data transmission and reception processing (first data transmission and reception processing) between the master station M and the slave stations SL1 to SLn and data transmission and reception processing (third data transmission and reception processing) between the communication processing unit 3M and the data processing unit 2. The communication processing unit 3M collectively DMA-transfers data, which is transmitted from the slave stations SL1 to SLn, to the data processing unit 2. The communication processing unit 3M includes a transmission buffer 31 and a reception buffer 32. The communication processing unit 3M stores data received from the CPU 1 in the transmission buffer 31 and transmits the data to the slave stations SL1 to SLn via the transmission buffer 31. The communication processing unit 3M stores data received from the slave stations SL1 to SLn in the reception buffer 32 and sends the data to the CPU 1 side via the reception buffer 32.

The memory 4 stores data sent from the CPU 1 to the data processing unit 2 and data sent from the communication processing unit 3M to the data processing unit 2. The data stored by the memory 4 is read out by the communication processing unit 3M at predetermined timing when readout permission is given from the CPU 1. The data is read out by the CPU 1 at predetermined timing when readout permission is given from the communication processing unit 3M.

In the PLC 10, data from the CPU 1 is sent to the data processing unit 2 and stored in the memory 4. After readout permission is given from the CPU 1, the communication processing unit 3M reads out the data stored in the memory 4. At this point, the communication processing unit 3M requests the data processing unit 2 to read out the data. Consequently, the data processing unit 2 divides the data stored in the memory 4 into data of a predetermined size and sends the data to the communication processing unit 3M. The communication processing unit 3M transmits the data received from the data processing unit 2 to the slave stations SL1 to SLn via the transmission buffer 31.

In the PLC 10, data received from the slave stations SL1 to SLn is stored in the reception buffer 32. The data stored in the reception buffer 32 is DMA-transferred to the data processing unit 2 and stored in the memory 4. After readout permission is given from the communication processing unit 3M, the CPU 1 reads out the data stored in the memory 4. At this point, the data processing unit 2 integrates the data stored in the memory 4 into data of a predetermined size and sends the data to the CPU 1.

Figure 3:
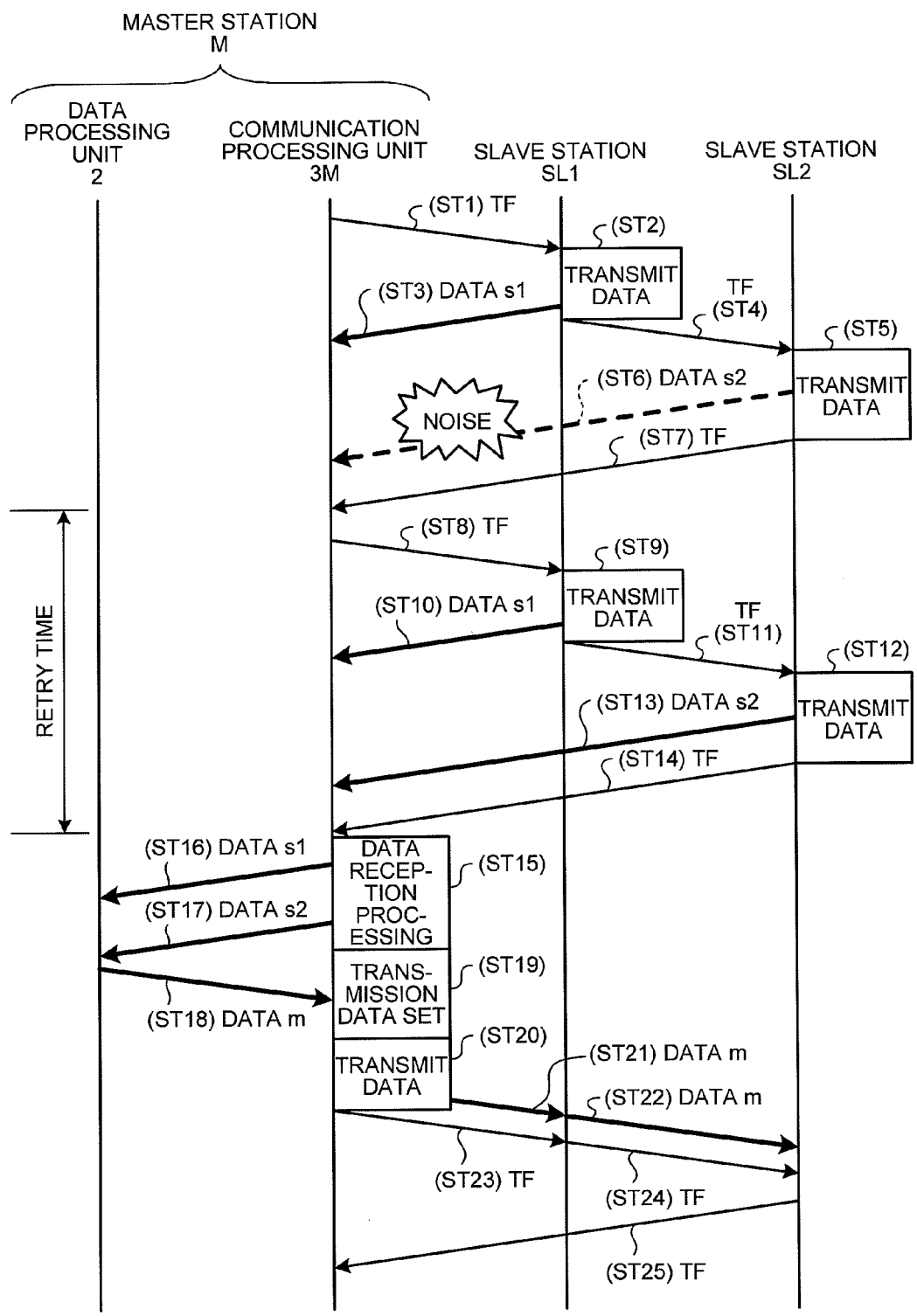
FIG. 3 is a sequence chart of a processing procedure of a data communication system according to the first embodiment.

A processing procedure of the data communication system 100 is explained. FIG. 3 is a sequence chart of a processing procedure of the data communication system according to the first embodiment. In the following explanation, slave stations in the data communication system 100 are two slave stations SL1 and SL2. First, a TF from the master station M is transmitted to the slave station SL1 and thereafter transmitted from the slave station SL1 to the slave station SL2.

One of characteristics of the processing procedure of the data communication system 100 according to this embodiment is that communication processing of one cycle including TF transmission to the slave station SL1 and data transmission from the slave station SL1 to the master station M, TF transmission to the slave station SL2 and data transmission from the slave station SL2 to the master station M, and TF transmission from the slave station SL2 to the master station M is repeated in two cycles.

In the data communication system 100, the communication processing unit 3M of the master station M transmits a TF (first time) to the slave station SL1 (ST1). When the slave station SL1 receives the TF, the slave station SL1 performs data transmission processing to the master station M (ST2). Data received from the slave station SL1 is sent to the communication processing unit 3M as data s1 (ST3). When the slave station SL1 completes the data transmission processing to the master station M, the slave station SL1 transmits the TF to the slave station SL2 (ST4).

When the slave station SL2 receives the TF, the slave station SL2 performs data transmission processing to the master station M (ST5). Data received from the slave station SL2 is sent to the communication processing unit 3M as data s2 (ST6). When the data transmission processing to the master station M is completed, the slave station SL2 transmits the TF to the master station M (ST7).

When the communication processing unit 3M of the master station M receives the data s1 and the data s2, the communication processing unit 3M stores the data in the reception buffer 32. In the following explanation, the data s1 at ST3 is normally received by the communication processing unit 3M and the data s2 at ST6 is not normally received by the communication processing unit 3M because of noise or the like (data transformation or a loss of data occurs).

When the communication processing unit 3M of the master station M according to this embodiment receives the TF (first time) from the slave station SL2, the communication processing unit 3M transmits the TF (second time) to the slave station SL1 irrespective of whether the data s1 and the data s2 can be normally received (ST8). In other words, the communication processing unit 3M transmits the next TF to the slave station SL1 without performing determination concerning whether the data s1 and s2 can be normally received or reception processing (F/W processing explained later) for the data s1 and s2 in the master station M.

When the slave station SL1 receives the TF, the slave station SL1 performs data transmission processing to the master station M (ST9). Data from the slave station SL1 is sent to the communication processing unit 3M as the data s1 (ST10). When the data transmission processing to the master station M is completed, the slave station SL1 transmits the TF to the slave station SL2 (ST11).

When the slave station SL2 receives the TF, the slave station performs data transmission processing to the master station M (ST12). Data received from the slave station SL2 is sent to the communication processing unit 3M as the data s2 (ST13). When the data transmission processing to the master station M is completed, the slave station SL2 transmits the TF to the master station M (ST14). At ST10 and ST13, the communication processing unit 3M normally receives the data s1 and s2. The data s1 and s2 received at ST10 and ST13 are stored in the reception buffer 32 together with the data s1 and s2 received at ST3 and ST6.

When the communication processing unit 3M receives the TF (second time) from the slave station SL2, the communication processing unit 3M performs reception processing for data (ST15). Specifically, the communication processing unit 3M determines whether the data s1 and s2 stored in the reception buffer 32 are normally-received data. When the communication processing unit 3M determines that at least one normal data is received from each of the slave stations (the slave stations SL1 and SL2), the communication processing unit 3M collectively DMA-transfers the data s1 and s2 received from the slave stations SL1 and SL2 to the data processing unit 2 (ST16 and ST17). This makes it possible to perform data transfer at higher speed than transferring data received from the slave stations to the data processing unit 2 one by one. When there is a slave station that cannot receive normal data at least once, the communication processing unit 3M can DMA-transfer only the normal data to the data processing unit 2 or does not have to perform the DMA transfer to the data processing unit 2. Thereafter, the communication processing unit 3M requests the data processing unit 2 to read out data.

If readout permission is given from the CPU 1, the data processing unit 2 sends the data stored in the memory 4 to the communication processing unit 3M (ST18). The data received from the data processing unit 2 is sent to the communication processing unit 3M as data m.

Consequently, the data m received from the data processing unit 2 is stored in the transmission buffer 31 of the communication processing unit 3M (transmission data set) (ST19). The communication processing unit 3M performs data transmission processing to the slave stations SL1 and SL2 (ST20). The data m is transmitted in broadcast from the transmission buffer 31 to the slave stations SL1 and SL2 (ST21 and ST22).

When the communication processing unit 3M completes the data transmission processing to the slave stations SL1 and SL2, the communication processing unit 3M transmits the TF to the slave station SL1 (ST23). When the slave station SL1 receives the TF from the communication processing unit 3M, the slave station SL1 transmits the TF to the slave station SL2 (ST24). When the slave station SL2 receives the TF from the slave station SL1, the slave station SL2 transmits the TF to the communication processing unit 3M (ST25). Thereafter, when the communication processing unit 3M receives the TF from the slave station SL2, in the data communication system 100, the master station M transmits data to the slave stations SL1 and SL2. Thereafter, the processing at ST1 to ST25 is repeated.

In this way, in this embodiment, after repeating the communication processing two cycles, the communication processing unit 3M performs the reception processing for data. In other words, the data communication system 100 necessarily retries the communication processing once without performing the F/W processing. This makes it possible to improve noise resistance of data transmitted from the slave stations SL1 and SL2 to the master station M. A retry time at this point is a time of the communication processing of one cycle. This retry time is a loss time caused by retry processing. Consequently, in the data communication system 100, the retry processing is performed in a short time. In this way, even when a method susceptible to noise such as an Ethernet (registered trademark) is used, the data communication system 100 can perform recovery of data communication in a short time and efficiently.

In order to clarify a difference between the processing procedures of the data communication system 100 according to this embodiment and the data communication system used in the past, problems of the processing procedure of the data communication system used in the past are explained.

Figure 4:
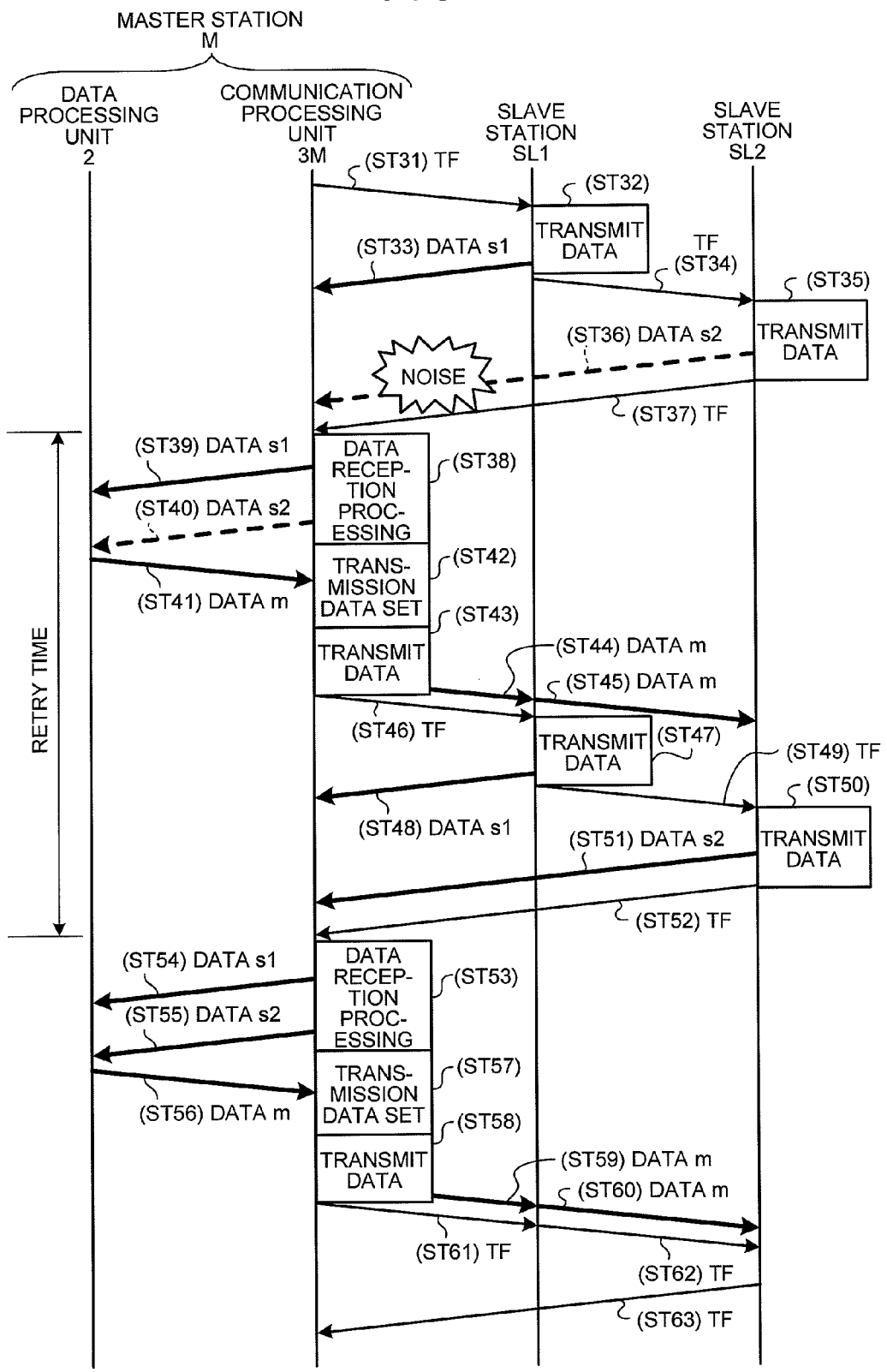
FIG. 4 is a sequence chart of a processing procedure of a data communication system in the past.

FIG. 4 is a sequence chart of the processing procedure of the data communication system in the past. In FIG. 4, a processing procedure in causing the data communication system 100 according to this embodiment to perform processing same as the processing of the data communication system in the past is shown. The data communication system 100 performs processing same as ST1 to ST7 shown in FIG. 3 as processing at ST31 to ST37.

After the slave station SL2 transmits the TF (first time) to the communication processing unit 3M (ST37), the communication processing unit 3M stores the data s1 and s2 in the reception buffer 32. In the following explanation, the data s1 at ST33 is normally received by the communication processing unit 3M and the data d2 at ST36 is not normally received by the communication processing unit 3M because of noise or the like.

When the communication processing unit 3M receives the TF (first time) from the slave station SL2, the communication processing unit 3M performs reception processing for data (normality determination for data and transfer processing to the data processing unit 2) (ST38). Specifically, the communication processing unit 3M DMA-transfers the data s1 and the data s2 to the data processing unit 2 (ST39 and ST40). At this point, regardless of the fact that the data s2 cannot be normally received because of noise or the like, the reception processing (DMA transfer, etc.) by the communication processing unit 3M is performed. Thereafter, the communication processing unit 3M requests the data processing unit 2 to read out data.

If readout permission is given from the CPU 1, the data processing unit 2 transmits the data stored in the memory 4 to the communication processing unit 3M (ST41). The data received from the data processing unit 2 is sent to the communication processing unit 3M as the data m.

Consequently, the data m received from the data processing unit 2 is stored in the transmission buffer 31 of the communication processing unit 3M (transmission data set) (ST42). The communication processing unit 3M performs data transmission processing to the slave stations SL1 and SL2 (ST43). The data m is transmitted in broadcast from the transmission buffer 31 to the slave stations SL1 and SL2 (ST44 and ST45).

When the communication processing unit 3M completes the data transmission processing to the slave stations SL1 and SL2, the communication processing unit 3M transmits the TF to the slave station SL1 (ST46). Thereafter, in the data communication system 100, processing same as ST9 to ST25 explained with reference to FIG. 3 in the first embodiment is performed. Processing at ST47 to ST63 shown in FIG. 4 corresponds to the processing at ST9 to ST25 shown in FIG. 3. Thereafter, when the communication processing unit 3M receives the TF from the slave station SL2, in the data communication system 100, data is transmitted from the master station M to the slave stations SL1 and SL2. Thereafter, the processing at ST31 to ST63 is repeated.

As explained above, in the data communication processing in the past, the retry processing is performed by the cyclic communication employing the token system. Every time the data s1 or s2 is transmitted from the slave station SL1 or SL2 (every time the TF is received), the reception processing (ST38), the transmission data set processing (ST42), or the like is performed. Therefore, the retry processing of the data communication processing in the past includes F/W processing concerning transmission and reception of data in the master station M such as the reception processing for the data by the communication processing unit 3M (ST38) and the transmission data set processing (ST42). In this way, in the data communication processing in the past, ST38 to ST52 are performed as the retry processing. When a ratio of the F/W processing (transmission and reception processing, etc.) in the master station M to a token hold time increases, time for the retry processing is extended. In particular, when a volume of data transmitted and received between stations (nodes) increases, the time for the retry processing is extended because longer time is required for the F/W processing. In this way, the retry processing in the past requires a long time compared with the data communication processing in this embodiment shown in FIG. 3.

In particular, when the communication processing unit 3M includes the transmission buffer 31 and the reception buffer 32 and performs the F/W processing in setting by a user, a long time is often required for the F/W processing. As a band of a transmission line is further improved (e.g., improved from 10 Mbps to 100 Mbps or improved from 100 Mbps to 1 Gbps), the performance of the F/W processing affects the performance of the data communication system 100 more.

When a loss of frame data is recovered by retry processing in a TCP (Transmission Control Protocol), several hundreds milliseconds is required as time for timeout. Application in a field network in which a real time property is regarded as important is difficult.

Figure 5:
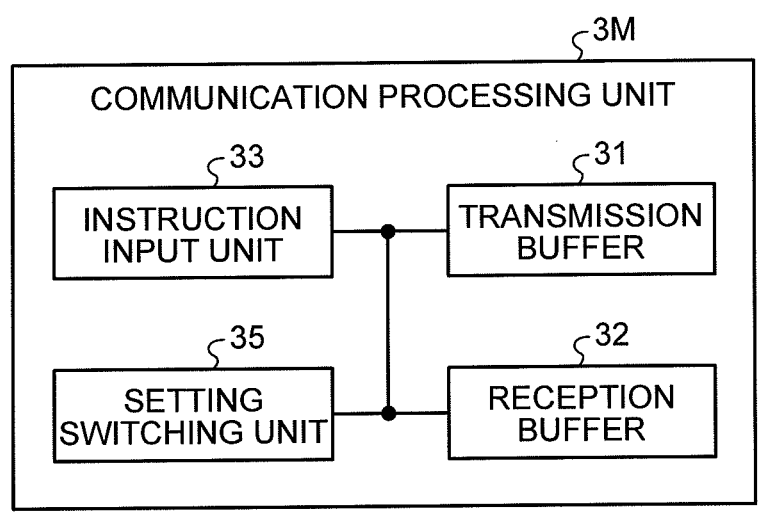
FIG. 5 is a diagram of the configuration of a communication processing unit that switches a type of retry processing according to user setting.

In the data communication system 100, the retry processing in the data communication processing shown in FIG. 3 and the retry processing in the data communication processing shown in FIG. 4 can be switched and used according to user setting. FIG. 5 is a diagram of the configuration of the communication processing unit that switches a type of retry processing according to user setting. As shown in the figure, the communication processing unit 3M that switches a type of retry processing according to user setting includes an instruction input unit 33 and a setting switching unit 35 in addition to the transmission buffer 31 and the reception buffer 32.

The instruction input unit 33 includes a mouse, a keyboard, and buttons and receives an instruction (an instruction for designating a type of data communication processing) externally input from a user. An instruction for designating the retry processing shown in FIG. 3 and an instruction for designating the retry processing shown in FIG. 4 are input to the instruction input unit 33. The instruction input unit 33 sends the instruction externally input from the user to the setting switching unit 35 as a setting instruction for the data communication processing. The setting switching unit 35 performs, base on the setting instruction for the retry processing sent from the instruction input unit 33, switching of the data communication processing.

Data communication between the data processing unit 2 and the CPU 1 is not explained with reference to FIG. 3. However, the data processing unit 2 and the CPU 1 performs data communication asynchronously with the data communication between the data processing unit 2 and the communication processing unit 3M.

In this embodiment, the data communication in the data communication system 100 is performed using the Ethernet (registered trademark). However, other communication methods can be used for the data communication in the data communication system 100.

In the explanation in this embodiment, the slave stations that perform the data communication with the master station M are the two slave stations SL1 and SL2. However, one or three or more slave stations can perform the data communication with the master station M.

In the explanation in this embodiment, the retry processing is performed only once. However, the retry processing can be performed twice or more. The number of times of the retry processing performed in the data communication system 100 is set in advance based on a user instruction from the instruction input unit 33 or the like. The set number of times of retry (the number of times of continuous transmission of a token frame) is stored in a data storing unit (not shown) in the communication processing unit 3M. This makes it possible to easily perform the retry processing for the number of times of the retry processing desired by the user.

As explained above, according to the first embodiment, when the TF (first time) is received from the slave station SL2, irrespective of whether the data s1 and s2 can be normally received, the master station M transmits the TF (second time) to the slave station SL1 without performing the reception processing for the data s1 and s2 in the master station M. This makes it possible to perform recovery processing for data communication in a short time. Therefore, it is possible to efficiently perform data communication.

Second Embodiment.

A second embodiment of the present invention is explained with reference to FIG. 6. In the second embodiment, in retry processing, the data m is retransmitted from the master station M to the slave stations SL1 and SL2.

Figure 6:
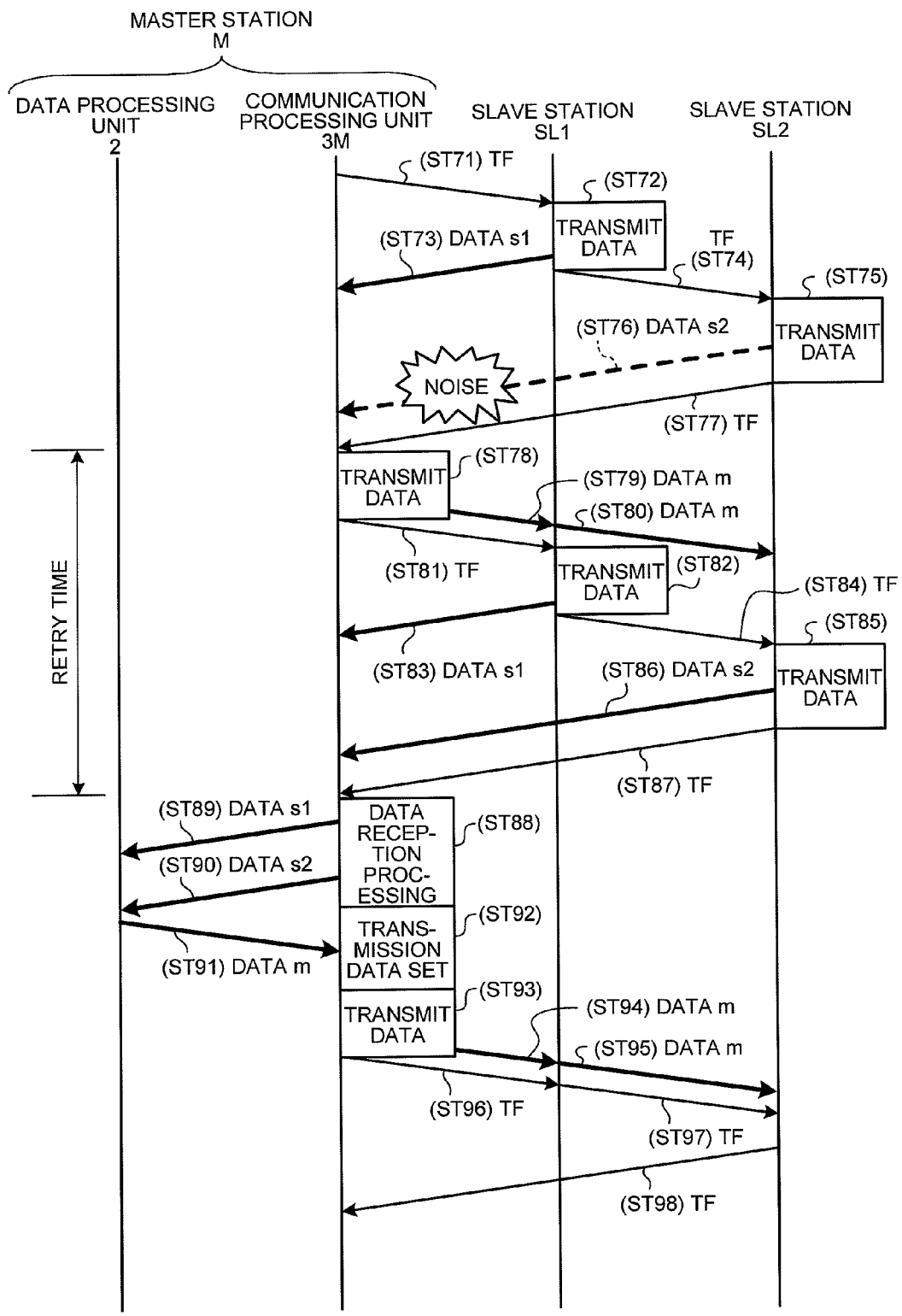
FIG. 6 is a sequence chart of a processing procedure of a data communication system according to a second embodiment.

FIG. 6 is a sequence chart of a processing procedure of a data communication system according to the second embodiment. The data communication system 100 according to the second embodiment performs processing same as ST1 to ST7 shown in FIG. 3 as processing at ST71 to ST77.

After the slave station SL2 transmits a TF (first time) to the communication processing unit 3M (ST77), the communication processing unit 3M stores the data s1 and the data s2 in the reception buffer 32. In the following explanation, the data s1 at ST73 is normally received by the communication processing unit 3M and the data s2 at ST76 is not normally received by the communication processing unit 3M because of noise or the like.

Subsequently, the communication processing unit 3M performs data transmission processing to the slave stations SL1 and SL2 irrespective of whether the data s1 and the data s2 can be normally received (ST78). At this point, the communication processing unit 3M performs data transmission to the slave stations SL1 and SL2 using the data m stored in the transmission buffer 31. The data m stored in the transmission buffer 31 is data same as the data m transmitted from the communication processing unit 3M to the slave station SL1 before the first TF is transmitted from the communication processing unit 3M to the slave station SL1. The data m is transmitted in broadcast from the transmission buffer 31 to the slave stations SL1 and SL2 (ST79 and ST80).

When the communication processing unit 3M completes the data transmission processing to the slave stations SL1 to SL2, the communication processing unit 3M transmits the TF to the slave station SL1 (ST81). Thereafter, in the data communication system 100, processing same as ST9 to ST25 explained with reference to FIG. 3 in the first embodiment is performed. Processing at ST82 to ST98 shown in FIG. 6 corresponds to processing at ST9 to ST25 shown in FIG. 3. Thereafter, when the communication processing unit 3M receives the TF from the slave station SL2, in the data communication system 100, data is transmitted from the master station M to the slave stations SL1 and SL2. Thereafter, the processing at ST71 to ST98 is repeated.

In this embodiment, as in the first embodiment, in the data communication system 100, the data communication processing shown in FIG. 3, the data communication processing shown in FIG. 4, and the data communication processing shown in FIG. 6 can be properly used according to a state in the data communication system 100. In this case, as in the data communication system 100 according to the first embodiment, a type of communication processing is switched by the communication processing unit 3M shown in FIG. 5. An instruction for designating any one of the data communication processing shown in FIG. 3, the data communication processing shown in FIG. 4, and the data communication processing shown in FIG. 6 is input to the instruction input unit 33.

The data m transmitted from the master station M to the slave stations SL1 and SL2 can be repeatedly transmitted a plurality of times. For example, the master station M can transmit the data m during retry to the slave stations SL1 and SL2 a plurality of number of times or transmit the data m during normal time to the slave stations SL1 and SL2 a plurality of number of times.

As explained above, according to the second embodiment, the data transmission from the master station M to the slave stations LS1 and LS2 is performed in the recovery processing. Therefore, it is possible to improve noise resistance of data transmitted from the master station M to the slave stations SL1 and SL2.

Third Embodiment

A third embodiment of the present invention is explained with reference to FIGS. 7 and 8. In the third embodiment, when the master station M receives the data s1 and s2, the communication processing unit 3M of the master station M determines which of the data communication processing (ST8 to ST14) shown in FIG. 3 and the data communication processing (ST38 to ST52) shown in FIG. 4 is performed and switches the data communication processing. At this point, the data communication system 100 switches a type of the data communication processing according to a state (a reception state of the data s1 and the data s2) in the data communication system 100.

Figure 7:
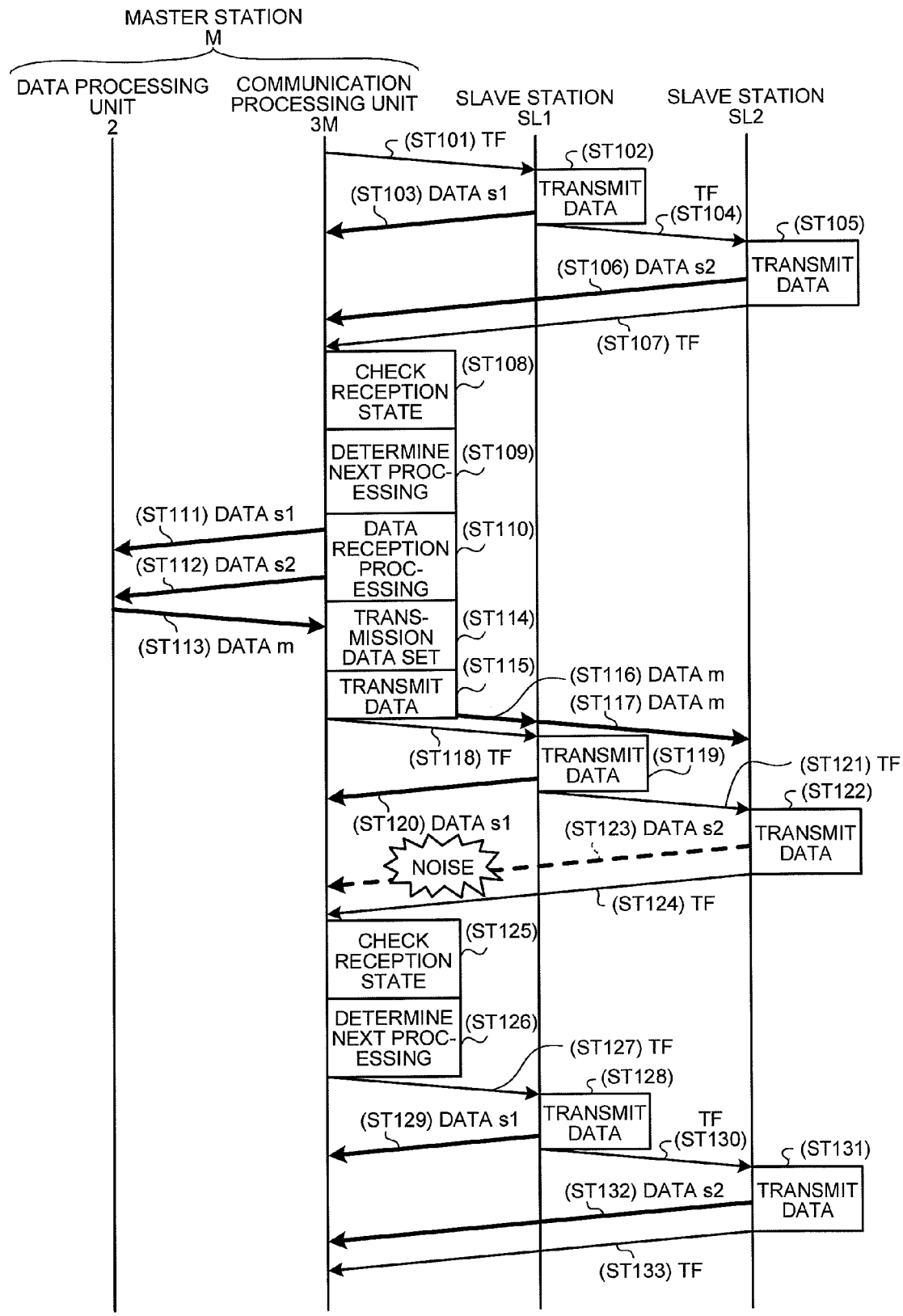
FIG. 7 is a sequence chart of a processing procedure of a data communication system according to a third embodiment.

FIG. 7 is a sequence chart of a processing procedure of a data communication system according to the third embodiment. The data communication system 100 according to the third embodiment performs processing same as ST1 to ST7 shown in FIG. 3 as the processing at ST101 to ST107.

After receiving a TF (first time) from the slave station SL2 (ST107), the communication processing unit 3M checks a reception state (an arrival situation) of the data s1 and the data s2 (ST108). Specifically, the communication processing unit 3M determines, using, for example, an FCS (Frame Check Sequence), whether the data s1 and s2 received from the slave stations SL1 and SL2 are normally-received data. In other words, the communication processing unit 3M determines whether data transmitted from the slave stations SL1 and SL2 in a period from time when the communication processing unit 3M issues a token frame until the communication processing unit 3M receives a token frame addressed to the communication processing unit 3M (ST101 to ST107) is normally received and whether the data is lost in a transmission line.

The communication processing unit 3M selects, based on a result of the determination, one of the data communication processing shown in FIG. 3 and the data communication processing shown in FIG. 4 (ST109). In other words, when the communication processing unit 3M receives the TF from the slave station SL2, the communication processing unit 3M determines whether the TF is issued to the slave station SL1 or the data s1 and s2 from the slave stations SL1 and SL2 are subjected to reception processing in the master station.

A selection method for the data communication processing by the communication processing unit 3M is explained. When the communication processing unit 3M determines that all data are normally received in data communication processing of one cycle, the communication processing unit 3M selects the data communication processing (F/W processing) shown in FIG. 4.

On the other hand, when the communication processing unit 3M determines that one of the data is not normally received because of occurrence of noise or the like, the communication processing unit 3M registers indication whether the data are normal in an information table. The information table is information table in which determination results concerning whether data received from the slave stations are normal are registered every time data is received (hereinafter referred to as "reception state information table"). The reception state information table is stored in the memory 4 of the master station M.

Because the master station M performs cyclic communication, the memory 4 is a memory shared among the slave stations SL1 to SLn. In the PLC 10, the CPU 1 (an application) performs transmission and reception of data as read and write of data from and in the memory 4. Therefore, data transmission from the master station M to the slave stations SL1 to SLn and data transmission from the slave station SL1 to SLn to the master station M are performed by the CPU 1 writing data in a transmission area on the memory 4 arranged in each of the stations. The CPU 1 overwrites latest data in the memory 4 such that the latest data is stored in the memory 4. Therefore, the latest data is stored in the reception state information table stored in the memory 4 of the master station M.

Figures 8, 9:
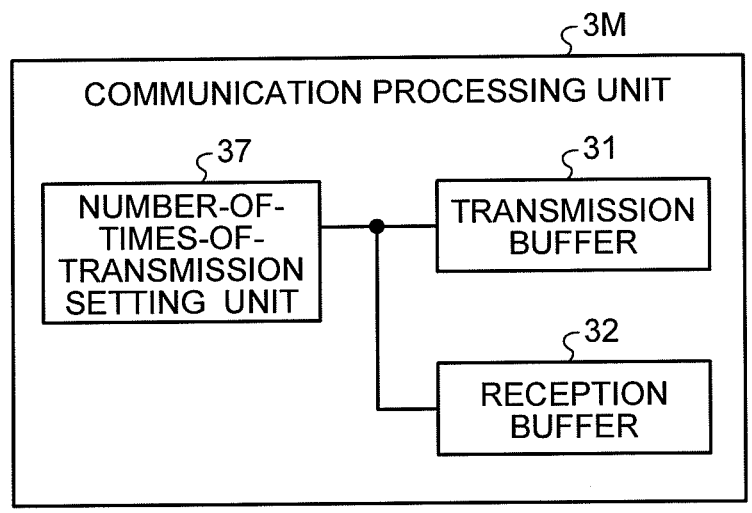
FIG. 8 is a diagram of an example of the structure of a reception state information table.
FIG. 9 is a diagram of the configuration of a communication processing unit of a master station according to a fourth embodiment.

FIG. 8 is a diagram of an example of the structure of the reception state information table. In a reception state information table 101, information indicating whether data received by the master station M from the slave stations SL1 to SLn are normal is registered for each reception time of the data.

In FIG. 8, for example, as information concerning data received from the slave station SL1, "OK" indicating that data reception for the first time is normal is registered, "NG" indicating that data reception for the second time is not normal is registered, and "NG" indicating that data reception for the xth (x is a natural number) is not normal is registered.

When any one of data from the slave stations SL1 to SLn cannot be normally received because of occurrence of noise or the like, the communication processing unit 3M registers a new number of times ((x+1)th time) in the reception state information table 101 and registers whether each of the data from the slave stations SL1 to SLn at this point is normal.

The communication processing unit 3M selects, based on the reception state information table 101, one of the data communication processing shown in FIG. 3 or the data communication processing shown in FIG. 4. If "OK" is registered in any number of times for the data from the slave stations SL1 to SLn in the reception state information table 101, the communication processing unit 3M selects the data communication processing shown in FIG. 4. On the other hand, if "NG" is registered in all the numbers of times for any one of the slave stations SL1 to SLn, the communication processing unit 3M selects the data communication processing (the retry processing) shown in FIG. 3. When the communication processing unit 3M determines that all the data are normally received in the data communication processing of one cycle, the communication processing unit 3M resets the information in the reception state information table 101. When the communication processing unit 3M selects the data communication processing shown in FIG. 4, the communication processing unit 3M resets the information in the reception state information table 101.

When the communication processing unit 3M selects a type of the data communication processing, the communication processing unit 3M sends an instruction to the setting switching unit 35 to perform data communication according to the selected data communication processing. The setting switching unit 35 performs, based on the instruction sent from the communication processing unit 3M, switching of the data communication processing.

In FIG. 7, the data s1 and s2 received at ST103 and ST106 are normal. Therefore, the communication processing unit 3M selects the data communication processing shown in FIG. 4. Consequently, in the data communication system 100, processing at ST110 to ST124 is performed as the data communication processing shown in FIG. 4. The processing at ST110 to ST124 corresponds to the processing at ST38 to ST52 shown in FIG. 4.

After the slave station SL2 sends the TF (second time) to the communication processing unit 3M (ST124), the communication processing unit 3M checks a reception state of the data s1 and the data s2 received this time (ST125). The communication processing unit 3M selects, based on a result of the check, one of the data communication processing shown in FIG. 3 and the data communication processing shown in FIG. 4 (ST126).

In FIG. 7, the data s1 and s2 received at ST103 and ST106 are normal. Therefore, the reception state information table 101 has been reset. In FIG. 7, the data s1 received at ST120 is normal and the data received at ST123 is not normal. Therefore, the communication processing unit 3M selects the data communication processing shown in FIG. 3. Consequently, in the data communication system 100, processing at ST127 to ST133 is performed as the data communication processing shown in FIG. 3. The processing at ST127 to ST133 corresponds to the processing at ST8 to ST14 shown in FIG. 3.

The communication processing unit 3M receives the data s1 and s2 from the slave stations SL1 and SL2 and performs the information registration in the reception state information table 101 and the reset of the reception state information table 101 every time the communication processing unit 3M receives the TF from the slave station SL2. The communication processing unit 3M selects, based on a determination result concerning whether the data s1 and s2 received this time are normal and the reception state information table 101, one of the data communication processing shown in FIG. 3 and the data communication processing shown in FIG. 4. The communication processing unit 3M repeats processing for performing the data communication between the master station M and the slave stations SL1 and SL2 according to the selected data communication processing.

In the explanation in this embodiment, the data communication is performed while the data communication processing (ST8 to ST14) shown in FIG. 3 and the data communication processing (ST38 to ST52) shown in FIG. 4 are switched. However, the data communication processing can be performed while the data communication processing (ST78 to ST87) shown in FIG. 6 and the data communication processing (ST38 to ST52) shown in FIG. 4 are switched.

In the explanation, the data communication processing shown in FIG. 3 and the data communication processing shown in FIG. 4 are switched. However, the communication processing unit 3M can set, based on the reception state of the data s1 and s2, the number of times of reply explained in the first embodiment. In this case, if the data s1 and s2 can be normally received, the communication processing unit 3M sets the number of times of retry to 0 and does not perform the retry processing. When the number of error portions of the data s1 and s2 received from the slave stations SL1 and SL2 is smaller than a predetermined number, the communication processing unit 3M sets a small number of times of retry (e.g., once). When the number of error portions of the data s1 and s2 received from the slave stations SL1 and SL2 is larger than the predetermined number, the communication processing unit 3M sets a large number of times of retry (e.g., three times). The communication processing unit 3M can set, based on the reception state of the data s1 and s2, the number of times of transmission of the data m explained in the second embodiment.

In the explanation in this embodiment, data is transmitted from the master station M to the slave stations SL1 and SL2 and, after the data s1 and s2 are received, check of a reception state and the next processing determination are performed. However, the check of a reception state and the next processing determination can be performed after the retry processing.

As explained above, according to the third embodiment, a type of the data communication processing is switched according to the reception state of the data s1 and s2. This makes it possible to perform appropriate data communication processing corresponding to the reception state of the data s1 and s2. Therefore, it is possible to efficiently perform data communication.

Fourth Embodiment.

A fourth embodiment of the present invention is explained with reference to FIGS. 9 to 12. In the fourth embodiment, when the master station M receives the data s1 and s2, the master station M instructs slave stations about the number of times the slave stations are caused to perform data transmission (the number of times of repetition of data transmission). At this point, the master station M determines, for each of the slave stations, the number of times the slave stations are caused to perform the data transmission.

FIG. 9 is a diagram of the configuration of a communication processing unit of a master station according to the fourth embodiment. As shown in the figure, the communication processing unit 3M includes a number-of-times-of-transmission setting unit 37 in addition to the transmission buffer 31 and the reception buffer 32.

The number-of-times-of-transmission setting unit 37 sets, based on a reception state of the data s1 and s2, the number of times the slave stations SL1 and SL2 are caused to perform data transmission. The communication processing unit 3M transmits information concerning the number of times of transmission (the number of times of data transmission) of the slave stations SL1 and SL2 set by the number-of-times-of-transmission setting unit 37 to the slave stations SL1 and SL2 with the information inserted in a TF.

Figure 10:
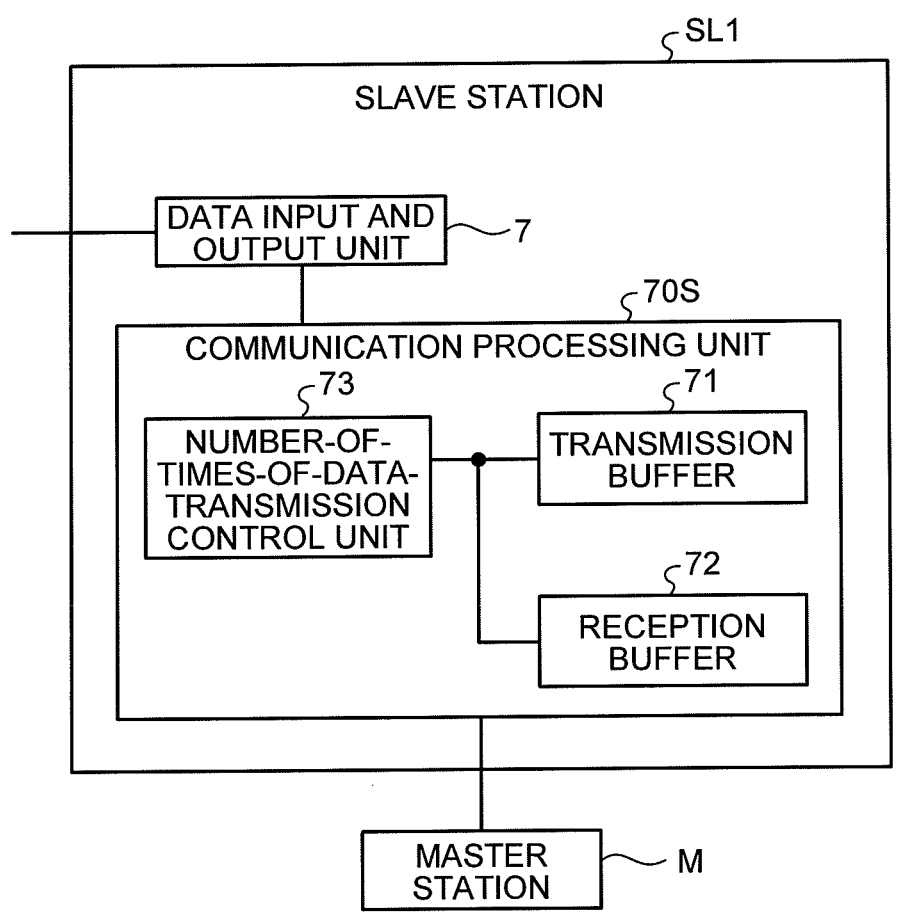
FIG. 10 is a diagram of the configuration of a slave station according to the fourth embodiment.

FIG. 10 is a diagram of the configuration of a slave station according to the fourth embodiment. Because the slave stations SL1 and SL2 have the same configuration, the configuration of the slave station SL1 is explained. As shown in FIG. 10, the slave station SL1 includes a data input and output unit 7 and a communication processing unit 70S.

The communication processing unit 70S performs data transmission and reception processing between the slave station SL1 and the master station M. The communication processing unit 70S includes a transmission buffer 71, a reception buffer 72, and a number-of-times-of-data-transmission control unit 73. The communication processing unit 70S stores data received from the data input and output unit 7 in the transmission buffer 71 and transmits the data to the master station M via the transmission buffer 71. The communication processing unit 70S stores data received from the master station M in the reception buffer 72 and sends the data to the data input and output unit 7 side via the reception buffer 72.

The number-of-times-of-data-transmission control unit 73 controls, based on the received TF, the number of times of data transmission to the master station M. For example, when the number of times of data transmission to the master station M is set to two in the TF, the number-of-times-of-data-transmission control unit 73 repeats the data transmission to the master station M twice.

The data input and output unit 7 is connected to peripheral devices (not shown) such as an IO device and a digital/analog converter and transmits an operation instruction received from the master station M to the peripheral devices. Data is transmitted to the data input and output unit 7 from the peripheral devices. The data transmitted from the peripheral devices to the data input and output unit 7 is transmitted to the master station M via the communication processing unit 70S.

Figure 11:
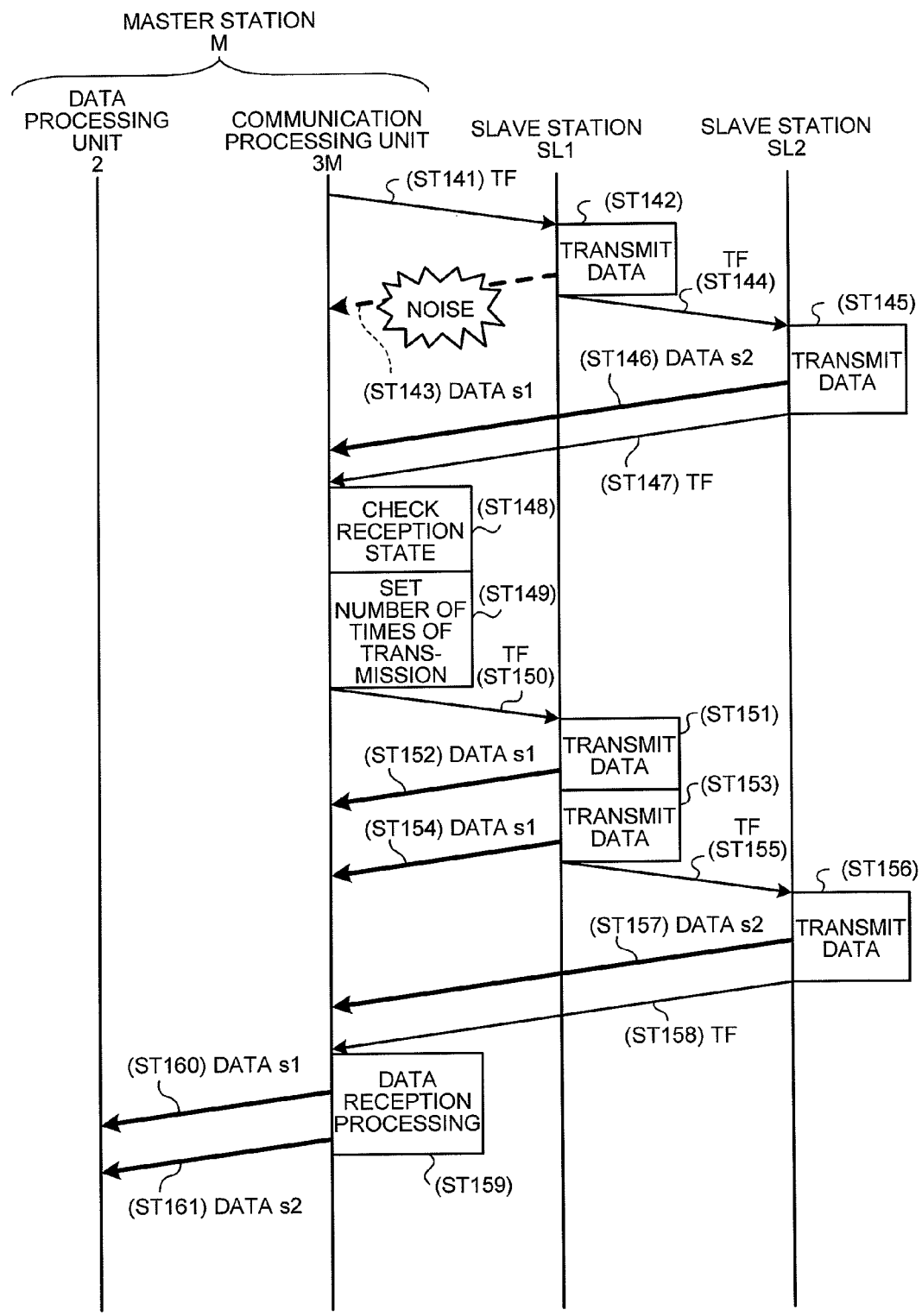
FIG. 11 is a sequence chart of a processing procedure of a data communication system according to the fourth embodiment.

FIG. 11 is a sequence chart of a processing procedure of the data communication system according to the fourth embodiment. The data communication system 100 according to the fourth embodiment performs processing same as ST1 to ST7 shown in FIG. 3 as processing at ST141 to ST147.

After the slave station SL2 transmits a TF (first time) to the communication processing unit 3M (ST147), the communication processing unit 3M checks a reception state of the data s1 and the data s2 (ST148). The communication processing unit 3M determines whether the data s1 and s2 received from the slave stations SL1 and SL2 are normally-received data.

When the data s1 and s2 received from the slave stations SL1 and SL2 are normally-received data, the communication processing unit 3M performs reception processing for data in the master station M. On the other hand, when the data s1 and s2 received from the slave stations SL1 and SL2 are not normally-received data, the number-of-times-of-transmission setting unit 37 sets, based on a determination result concerning whether the data s1 and s2 are normally-received data and a state (an error amount) of the received data s1 and s2, the number of times (the number of times of repetition) for causing the slave stations SL1 and SL2 to perform data transmission (ST149).

Specifically, when the data s1 and s2 can be received from the slave stations SL1 and SL2, the number-of-times-of-transmission setting unit 37 sets a small number of times of transmission (e.g., zero time or once) in the slave stations from which the data can be received. When error portions of the data s1 and s2 received from the slave stations SL1 and SL2 are smaller than a predetermined amount, the number-of-times-of-transmission setting unit 37 sets a small number of times of data transmission (e.g., twice) in the slave stations. When error portions of the data s1 and s2 received from the slave stations SL1 and SL2 are larger than the predetermined amount, the number-of-times-of-transmission setting unit 37 sets a large number of times of data transmission (e.g., three times) in the slave stations. When the data s1 and s2 cannot be received from the slave stations SL1 and SL2, the number-of-times-of-transmission setting unit 37 sets a large number of times of data transmission (e.g., four times) in the slave stations from which the data cannot be received. In the explanation in this embodiment, the number-of-times-of-transmission setting unit 37 sets the number of times the slave station SL1 is caused to perform data transmission to twice and sets the number of times the slave station SL2 is caused to perform data transmission to once.

The communication processing unit 3M inserts information concerning the number of times of transmission for each of the slave stations set by the number-of-times-of-transmission setting unit 37 (twice for the slave station SL1 and once for the slave station SL2) into the TF to be transmitted next. The communication processing unit 3M transmits the TF to the slave station SL1 (ST150). The communication processing unit 70S of the slave station SL1 receives the TF from the master station M. The number-of-times-of-data-transmission control unit 73 sets, based on the TF from the master station M, the number of times of data transmission to the master station M. Because the slave station SL1 is set to perform data transmission twice in the TF, the number-of-times-of-data-transmission control unit 73 sets the number of times of data transmission to two. The slave station SL1 performs data transmission processing to the master station M (first time) (ST151). Data received from the slave station SL1 is transmitted to the communication processing unit 3M as the data s1 (ST152). Further, because the number of times of data transmission from the slave station SL1 is set to two in the TF, the communication processing unit 3M performs the data transmission processing to the master station M (second time) (ST153). Data received from the slave station SL1 is transmitted to the communication processing unit 3M as the data s1 (ST154). When the slave station SL1 completes the data transmission processing to the master station M (second time), the slave station SL1 transmits the TF to the slave station SL2 (ST155). The information concerning the number of times of transmission for each of the slave stations set by the number-of-times-of-transmission setting unit 37 of the master station M is inserted in this TF.

The communication processing unit 70S of the slave station SL2 receives the TF from the slave station SL1. The number-of-times-of-data-transmission control unit 73 of the slave station SL2 sets, based on the TF, the number of times of data transmission processing to the master station M. Because the slave station SL2 is set to perform data transmission once in the TF, the number-of-times-of-data-transmission control unit 73 sets the number of times of data transmission to one. The slave station SL2 performs data transmission processing to the master station M (ST156). Data received from the slave station SL2 is transmitted to the communication processing unit 3M as the data s2 (ST157). Because the number of times of data transmission from the slave station SL2 is set to one in the TF, when the data transmission processing to the master station M (first time) is completed, the communication processing unit 70S transmits the TF to the master station M (ST158).

When the communication processing unit 3M receives the TF from the slave station SL2, the communication processing unit 3M performs reception processing for data (ST159). At this point, only when the data s1 and s2 received from the slave stations SL1 and SL2 are normally-received data, the communication processing unit 3M can perform reception processing for data in the master station M. In this case, unless the data s1 and s2 received from the slave stations SL1 and SL2 are not normally-received data, in the data communication system 100, the processing at ST149 to ST158 is performed again.

The communication processing unit 3M collectively DMA-transfers the data s1 and s2 received from the slave stations SL1 and SL2 to the data processing unit 2 (ST160 and ST161). Thereafter, the communication processing unit 3M requests the data processing unit 2 to read out data and performs the processing at ST18 to ST25 explained with reference to FIG. 3 in the first embodiment. When the communication processing unit 3M receives the TF from the slave station ST2, in the data communication system 100, data is transmitted from the master station M to the slave stations SL1 and SL2. Thereafter, the processing at ST141 to ST161 and the processing at ST18 to ST25 shown in FIG. 3 are repeated.

In the explanation in this embodiment, the number-of-times-of-transmission setting unit 37 sets the number of times the slave stations SL1 and SL2 are caused to perform data transmission. However, the number of times the slave stations SL1 and SL2 are caused to perform data transmission can be set by a user in advance. In this case, the communication processing unit 3M shown in FIG. 9 has the function of the instruction input unit 33 shown in FIG. 5.

In the explanation in this embodiment, the number of times the slave stations SL1 and SL2 are caused to perform data transmission is set based on a reception state of the data s1 and s2 at the time when the number-of-times-of-transmission setting unit 37 receives the data s1 and s2. However, the number of times the slave stations SL1 and SL2 are caused to perform data transmission can be set based on reception states of the data s1 and s2 received in the past (statistic information calculated using a history of reception states).

Figure 12:
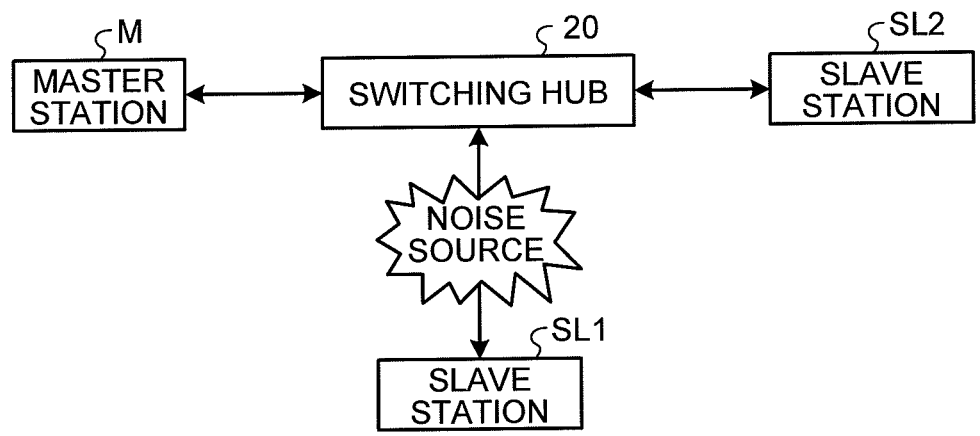
FIG. 12 is a diagram for explaining data communication via a switching hub.

In the data communication system 100, for example, data communication between the stations is performed via a switching hub 20 as shown in FIG. 12. FIG. 12 is a diagram for explaining data communication via a switching hub. In this case, in some case, noise tends to occur only in a predetermined transmission line. Therefore, if the number-of-times-of-transmission setting unit 37 sets, based on the statistic information of reception states, the number of times the slave stations SL1 and SL2 are caused to perform data transmission, it is possible to set, for each of the slave stations, the number of times of transmission corresponding to a ratio of occurrence of noise.

The number-of-times-of-transmission setting unit 37 determines, using, for example, an FCS, whether the data s1 and s2 received from the slave stations SL1 and SL2 are normally-received data. The number-of-times-of-transmission setting unit 37 accumulates a result of the determination and creates, based on the accumulated determination result, statistic information (a ratio of occurrence of noise) concerning a reception state of data (whether reception is normal reception). The number-of-times-of-transmission setting unit 37 sets, based on the created statistic information, the number of times the slave stations SL1 and SL2 are caused to perform data transmission. In this case, before receiving the TF from the slave station SL2, the number-of-times-of-transmission setting unit 37 can set in advance, based on the statistic information of reception state, the number of times the slave stations SL1 and SL2 are caused to perform data transmission.

The number-of-times-of-transmission setting unit 37 can set, based on the number of slave stations with which the master station M performs data communication, time required for the data communication with the slave stations, time required for data processing performed in the master station M, and the like, the number of times the slave stations SL1 and SL2 are caused to perform data transmission.

In the explanation in this embodiment, data is transmitted from the master station M to the slave stations SL1 and SL2 and, after the data s1 and s2 are received, the check of a reception state and the setting of the number of times of transmission are performed. However, the check of a reception state and the setting of the number of times of transmission can be performed after the retry processing.

As explained above, according to the fourth embodiment, the number of times the slave stations SL1 and SL2 are caused to perform data transmission is set based on a reception state of the data s1 and s2. This makes it possible to perform appropriate recovery processing corresponding to the reception state of the data s1 and s2. Therefore, it is possible to efficiently perform data communication.

Fifth Embodiment.

A fifth embodiment of the present invention is explained with reference to FIGS. 13 to 20. In the fifth embodiment, when cyclic communication is performed, cyclic data is divided, a sequential No (a sequential number), an end flag (end information), and data storage range information are given to the divided cyclic data to perform data management. When cyclic data transmitted from other stations is updated in a memory of an own station, it is determined based on the sequential No and the end flag whether all the cyclic data can be received. When all the cyclic data can be received, the cyclic data is expanded in the memory of the own station. The data storage range information is data length of the divided cyclic data and an address in storing the divided cyclic data in the memory. The stations store the cyclic data in positions in memories conforming to the data storage range information.

Cyclic communication used in the FA field or the like is a communication method in which a plurality of stations connected to a transmission line share data of the stations one another. In this cyclic communication, the stations includes, in each of the stations, a shared memory used in common with the other stations (a memory that stores data common to all the stations). A shared memory of each of the stations includes a transmission area and a reception area. The station stores data acquired by the station in the transmission area and stores data from the other stations in the reception area. Each of the stations transmits the data stored in the transmission area of the own station to the reception areas of the shared memories of the other stations at a predetermined period. This makes it possible to share data common among the stations (station unit guarantee of cyclic data).

Figure 13:
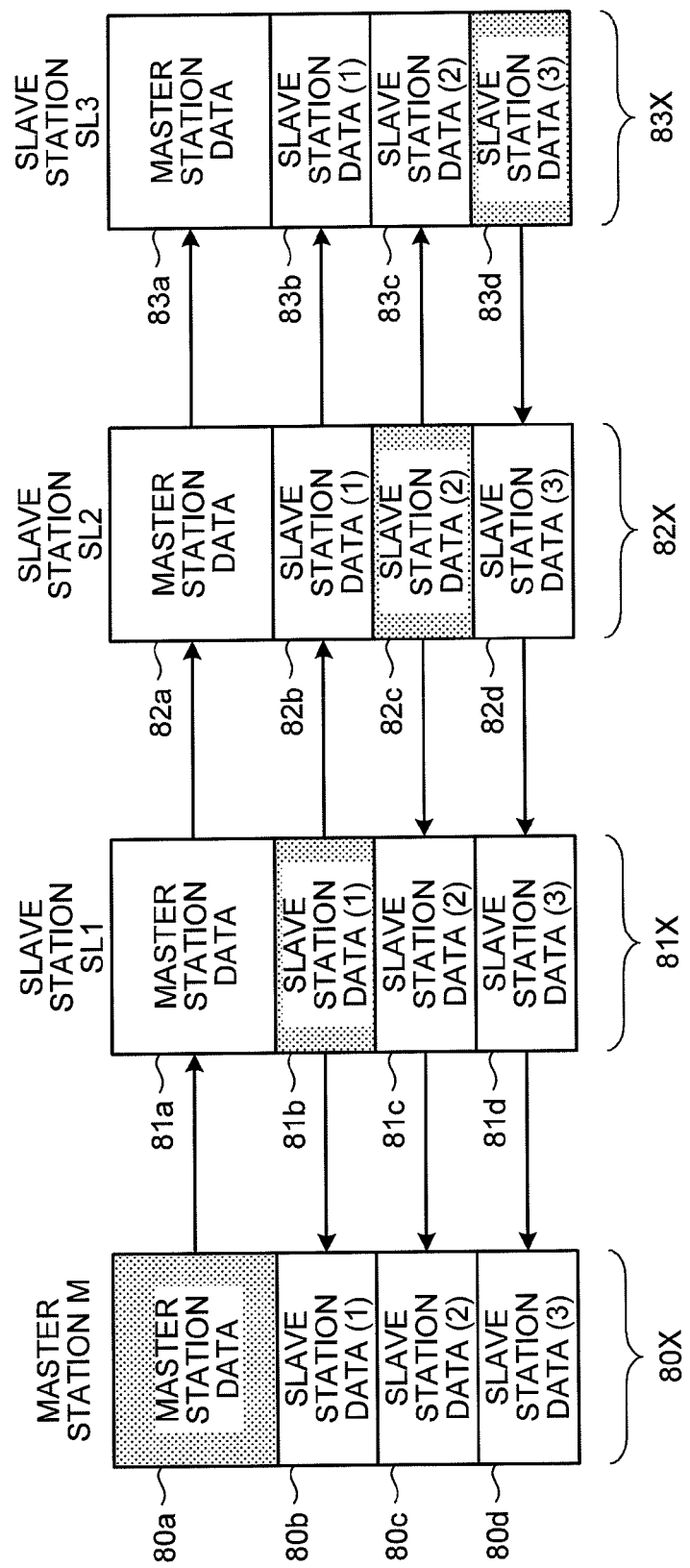
FIG. 13 is a diagram of a memory configuration of a data communication system according to a fifth embodiment.

FIG. 13 is a diagram of a memory configuration of a data communication system according to the fifth embodiment. In FIG. 13, a shared memory included in the master station M is represented as shared memory 80X. Shared memories included in the slave stations SL1 to SL3 are respectively represented as shared memories 81X to 83X. In FIG. 13, slave stations of the data communication system 100 are three slave stations SL1 to SL3.

The shared memory 80X of the master station M includes a transmission area 80a in which data of the own station (the master station M) is stored as master station data, a reception area 80b in which data transmitted from the slave station SL1 is stored as slave station data (1), a reception area 80c in which data transmitted from the slave station SL2 is stored as slave station data (2), and a reception area 80d in which data transmitted from the slave station SL3 is stored as slave station data (3).

The shared memory 81X of the slave station SL1 includes a reception area 81a in which data transmitted from the master station X is stored as master station data, a transmission area 81b in which data of the own station (the slave station SL1) is stored as slave station data (1), a reception area 81c in which data transmitted from the slave station SL2 is stored as slave station data (2), and a reception area 81d in which data transmitted from the slave station SL3 is stored as slave station data (3).

The shared memory 82X of the slave station SL2 includes a reception area 82a in which data transmitted from the master station M is stored as master station data, a transmission area 82c in which data of the own station (the slave station SL2) is stored as slave station data (2), a reception area 82b in which data transmitted from the slave station SL1 is stored as slave station data (1), and a reception area 82d in which data transmitted from the slave station SL3 is stored as slave station data (3).

The shared memory 83X of the slave station SL3 includes a reception area 83a in which data transmitted from the master station M is stored as master station data, a transmission area 83d in which data of the own station (the slave station SL3) is stored as slave station data (3), a reception area 83b in which data transmitted from the slave station SL1 is stored as slave station data (1), and a reception area 83c in which data transmitted from the slave station SL2 is stored as slave station data (2).

In the cyclic communication, when a transmission right for transmitting data once is acquired (TF reception), a frame of data (cyclic data) stored in a transmission area of an own station is divided and frames after the division (hereinafter also referred to as divided frames) are transmitted to the other stations. At this point, in the other stations, it is necessary to receive all the divided frames from the station that acquires the transmission right and update the divided frames to latest cyclic data. In other words, at a point when the transmission right is acquired, all the cyclic data have to be updated. Update of only a part of the cyclic data is not permitted. In the past, when only a part of the cyclic data can be received from the station that acquires the transmission right, it is necessary to retransmit (continuously transmit) the cyclic data that cannot be received.

However, when a retransmission function for cyclic data is implemented in the stations, reception processing for data is complicated. In some case, this adversely affects a real time property of data sharing. Therefore, in the data communication system 100 according to this embodiment, the divided frames are transmitted with sequential Nos and an end flag given thereto. When the cyclic data is transmitted, it is determined based on the sequential Nos and the end flag whether all the divided frames can be received. When all the divided frames can be received, the cyclic data is updated.

Figure 14:
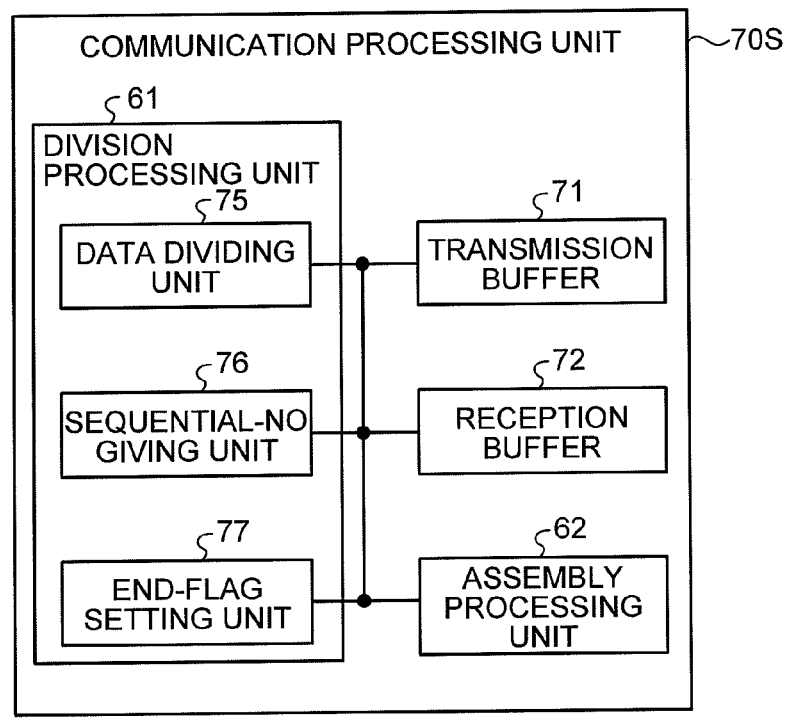
FIG. 14 is a diagram of the configuration of a communication processing unit of a slave station according to the fifth embodiment.

The configurations of the master station M and the slave stations SL1 to SL3 according to this embodiment are explained. FIG. 14 is a diagram of the configuration of a communication processing unit of a slave station according to the fifth embodiment. Because the slave stations SL1 to SL3 has the same configuration, the communication processing unit 70S of the slave station SL1 is explained. The communication processing unit 70S of the slave station SL1 according to the fifth embodiment includes the transmission buffer 71, the reception buffer 72, a division processing unit 61, and an assembly processing unit 62. The division processing unit 61 performs, for example, division of cyclic data into divided frames. The assembly processing unit 62 performs, for example, determination concerning whether all the divided frames can be received.

The division processing unit 61 includes a data dividing unit 75, a sequential-No giving unit 76, and an end-flag setting unit 77. When cyclic data stored in the transmission area 81b of the shared memory 81X is transmitted to the other stations, the data dividing unit 75 divides the cyclic data.

When the slave station SL1 receives a TF and acquires a transmission right for data, the data dividing unit 75 divides the cyclic data.

The sequential-No giving unit 76 gives a sequential No to each of the cyclic data (the divided frames) divided by the data dividing unit 75. The end-flag setting unit 77 gives an end flag to a last divided frame among the cyclic data divided by the data dividing unit 75.

Figure 15:
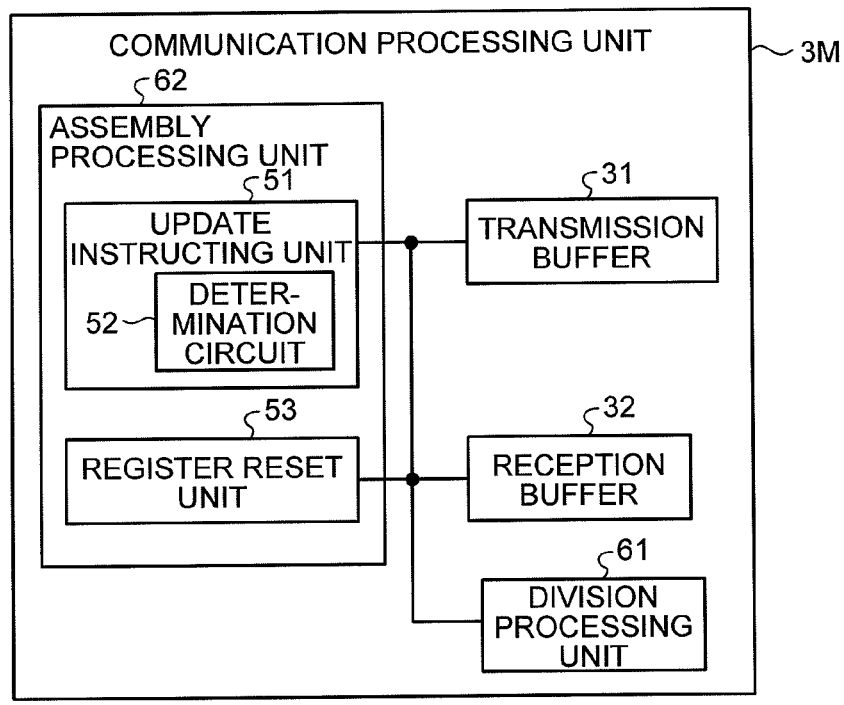
FIG. 15 is a diagram of the configuration of a communication processing unit of a master station according to the fifth embodiment.

FIG. 15 is a diagram of the configuration of a communication processing unit of a master station according to the fifth embodiment. The communication processing unit 3M of the master station M according to the fifth embodiment determines based on sequential Nos and end flags given to cyclic data transmitted from the other stations (the slave stations SL1 to SL3) whether all the cyclic data can be received. When all the cyclic data can be received, the communication processing unit 3M expands the cyclic data in the shared memory 80X of the own station.

The communication processing unit 3M includes the transmission buffer 31, the reception buffer 32, the division processing unit 61, and the assembly processing unit 62. The assembly processing unit 62 includes an update instructing unit 51 and a register reset unit 53. The update instructing unit 51 includes a determination circuit 52 that determines whether all divided frames are received. When the determination circuit 52 determines that all the divided frames are received, the update instructing unit 51 expands the divided frames in the shared memory 80X. The determination circuit 52 includes a register (a sequential No register 91 explained later) in which information concerning whether divided frames corresponding to sequential Nos are received is input and a register (an end flag register 92 explained later) in which information concerning whether an end flag is given to the divided frames is input. The determination circuit 52 determines, according to the information input to the sequential No register 91 and the end flag register 92, whether all the divided frames are received.

The register reset unit 53 determines based on an SA (source address) given in cyclic data whether the cyclic data is received from any one of the stations. The SA is frame transmission source information indicating a transmission source of the cyclic data. For example, when the divided frames are received from a station different from the last station, the register reset unit 53 discards sequential Nos and an end flag received from the last station and resets the determination circuit 52.

Figure 16:
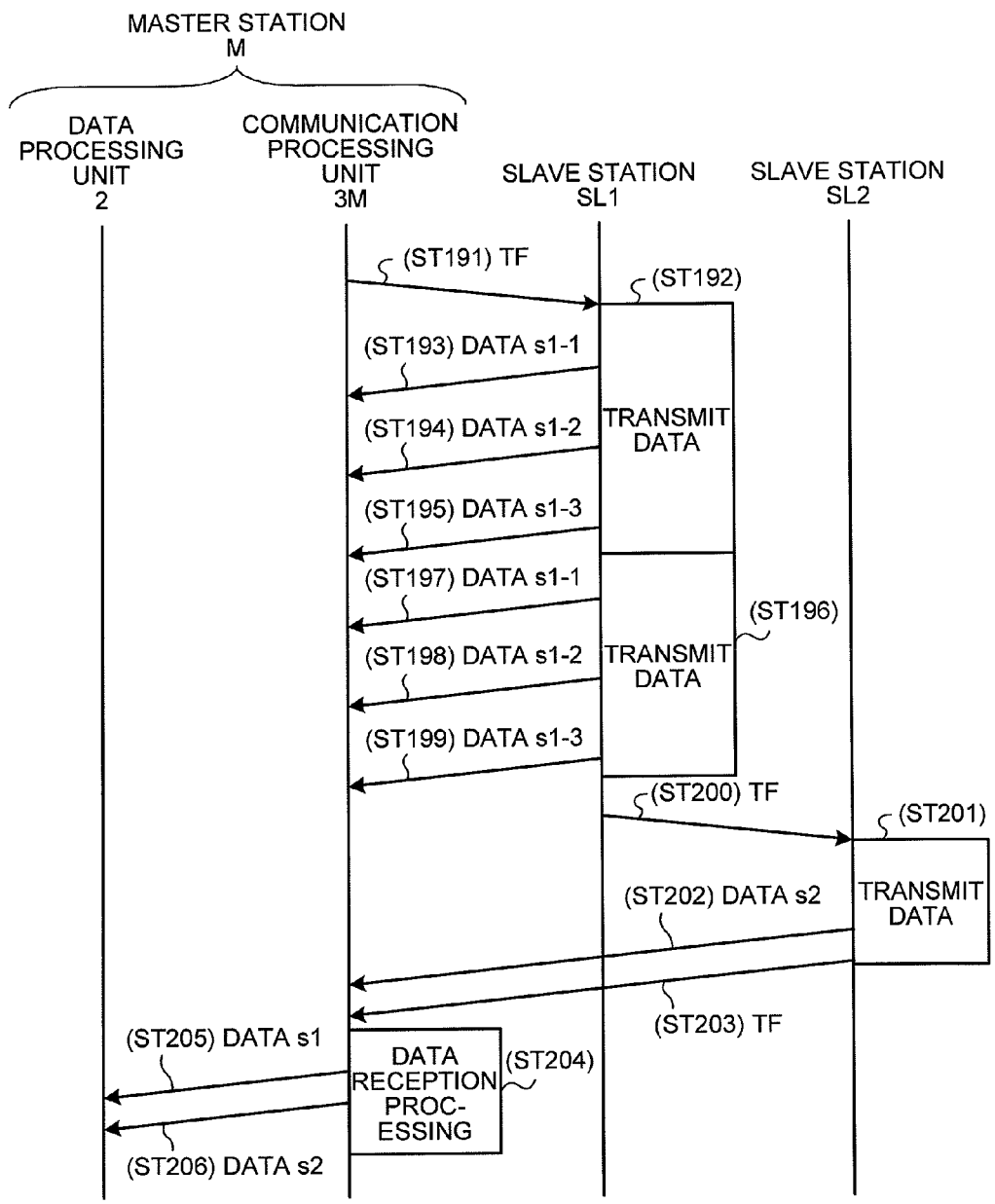
FIG. 16 is a sequence chart of a processing procedure of the data communication system according to the fifth embodiment.

A processing procedure of the data communication system 100 according to the fifth embodiment is explained. FIG. 16 is a sequence chart of a processing procedure of the data communication system according to the fifth embodiment. In the following explanation, slave stations in the data communication system 100 are two slave stations SL1 and SL2. In the following explanation, first, a TF from the master station M is transmitted to the slave station SL1 and, thereafter, the TF is transmitted from the slave station SL1 to the slave station SL2.

In the data communication system 100, the communication processing unit 3M of the master station M transmits a TF to the slave station SL1 (ST191). When the slave station SL1 receives the TF, the slave station SL1 performs data transmission processing to the master station M (ST192). At this point, the communication processing unit 70S of the slave station SL1 divides cyclic data of the own station stored in the transmission area 81b in the shared memory 81X and transmits the cyclic data to the master station M. The data transmission from the slave station SL1 to the master station M is repeated a plurality of times (two cycles). In this way, in the data communication system 100 according to this embodiment, when the transmission of the cyclic data is performed, the data transmission is repeated a plurality of times. In the data transmission, the cyclic data is divided and transmitted.

Figure 17:
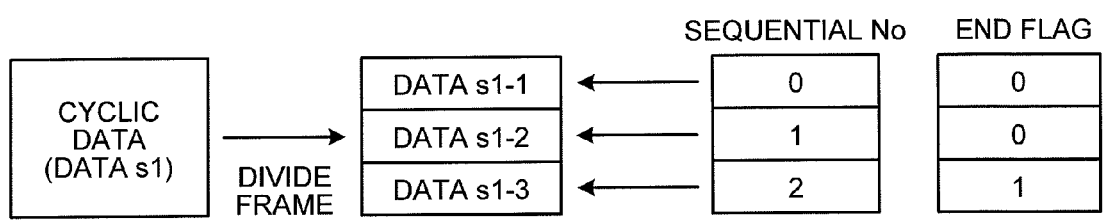
FIG. 17 is a diagram for explaining division processing for cyclic data.

FIG. 17 is a diagram for explaining division processing for cyclic data. The data dividing unit 75 of the slave station SL1 divides the cyclic data (the data s1) stored in the transmission area 81b of the shared memory 81X into data of a predetermined size. In the following explanation, the data dividing unit 75 divides the cyclic data into three data (data s1-1, s1-2, and s1-3). When the data dividing unit 75 divides the cyclic data into the three data, the sequential-No giving unit 76 gives a sequential No to each of divided frames. For example, the sequential-No giving unit 76 gives a sequential No "0" to a first divided frame (the data s1-1), gives a sequential No "1" to a second divided frame (the data s1-2), and gives a sequential No "2" to a third divided frame (the data s1-3). The end-flag setting unit 77 gives an end flag to a last divided frame among the divided frames. Because the cyclic data is divided into three, the end-flag setting unit 77 gives an end flag "1" to the third divided frame.

The communication processing unit 70S of the slave station SL1 transmits the divided frames given with the sequential Nos and the end flag to the master station M. First, the communication processing unit 70S transmits the first divided frame to the master station M as the data s1-1 (ST193). Further, the communication processing unit 70S transmits the second divided frame to the master station M as the data s1-2 (ST194) and transmits the third divided frame to the master station M as the data s1-3 (ST195).

Thereafter, the communication processing unit 70S repeats data transmission same as ST192 (ST196). Specifically, the communication processing unit 70S transmits the divided frames to the master station M in order of the first divided frame (the data s1-1), the second divided frame (the data s1-2), and the third divided frame (the data s1-3) (ST197, ST198, and ST199).

When the communication processing unit 3M of the master station M receives the divided frames from the slave station SL1, the communication processing unit 3M extracts the sequential Nos and the end flag given to the divided frames. The communication processing unit 3M inputs information corresponding to the sequential Nos and the end flag to the sequential No register 91 and the end flag register 92 of the determination circuit 52.

Figure 18:
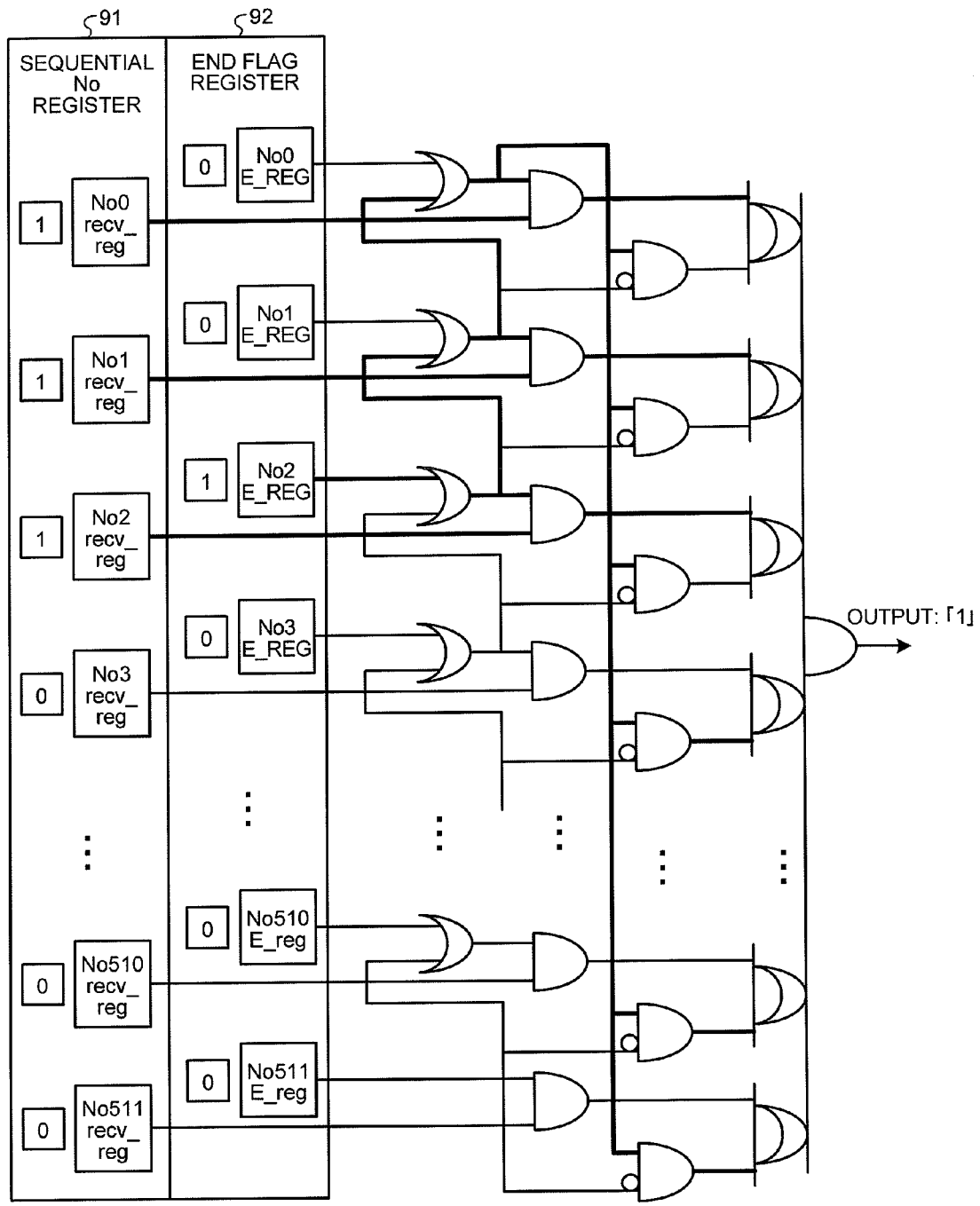
FIG. 18 is a diagram of a determination circuit that receives all divided frames.
Figure 19:
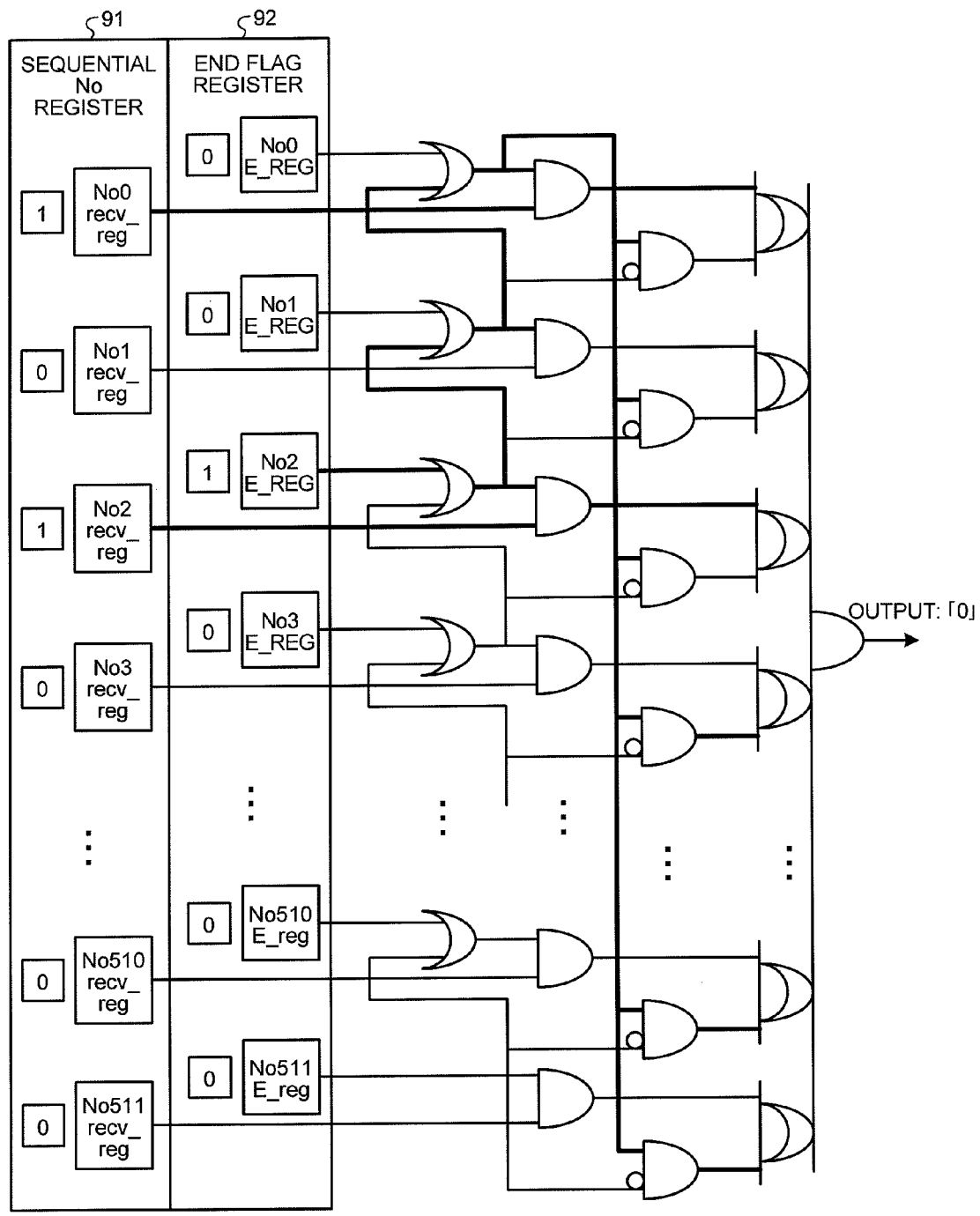
FIG. 19 is a diagram of the determination circuit that cannot receive a part of the divided frames.

FIGS. 18 and 19 are diagrams of a configuration example of the determination circuit and information input to the determination circuit. In FIG. 18, the determination circuit 52 that receives all the divided frames is shown. In FIG. 18, the determination circuit 52 that cannot receive a part of the divided frames is shown.

The determination circuit 52 includes the sequential No register 91 and the end flag register 92. The determination circuit 52 receives information input to the sequential No register 91 and the end flag register 92 and outputs a determination result concerning whether all the divided frames are received from the slave station SL1.

The sequential No register 91 includes, for example, 512 registers. The registers respectively correspond to the divided frames. The end flag register 92 includes, for example, 512 registers. The registers respectively correspond to the divided frames. For example, a first register (No0 recv_Reg) of the sequential No register 91 corresponds to the divided frame having the sequential No "0" and a second register (No1 recv_Reg) corresponds to the divided frame having the sequential No. "1". A first register (No0 E_Reg) of the end flag register 92 corresponds to the divided frame having the sequential No "0" and a second register (No1 E_Reg) corresponds to the divided frame having the sequential No "1".

When the master station M receives the divided frames from the slave station SL1, the update instructing unit 51 extracts all the sequential No and the end flag given to the divided frames. The update instructing unit 51 extracts the sequential Nos "1" to "3" and the end flag having the sequential No "3".

Initial values of the sequential No register 91 and the end flag register 92 are "0". The update instructing unit 51 inputs "1" to the registers corresponding to the extracted sequential Nos in the sequential No register 91. "1" is input to the registers corresponding to the sequential Nos "1" to "3". Specifically, "1" is input to the register "No0 recv_Reg", the register "No1 recv_Reg", and the register "No2 recv_Reg". Because the end flag having the sequential No "3" is extracted, "1" is input to the end flag corresponding to the divided frame having the sequential No "3" in the end flag register 92.

The determination circuit 52 is configured to output, when "1" is input to the registers corresponding to all the divided frames in the sequential No register 91 and "1" is input to any one of the registers of the end flag register 92, "1" indicating that all the divided frames are received.

In the determination circuit 52 shown in FIG. 18, "1" is input to the registers corresponding to all the divided frames. In the determination circuit 52 shown in FIG. 18, "1" is input to the end flag corresponding to the divided frame having the sequential No "3". Therefore, "1" indicating that all the divided frames are received is output from the determination circuit 52 shown in FIG. 18.

In the determination circuit 52 shown in FIG. 19, "1" is not input to the registers corresponding to a part of the divided frames. Specifically, "0" is still input to the register "No1 recv_Reg". Therefore, "0" indicating that not all the divided frames are received is output from the determination circuit 52 shown in FIG. 19.

Among the divided frames, the correctly-received divided frames are stored in the reception buffer 32 of the communication processing unit 3M. The slave station SL1 repeats the transmission of the cyclic data twice. Therefore, the cyclic data is transmitted to the master station M twice. When the cyclic data is transmitted for the second time, the update instructing unit 51 also extracts all the sequential Nos and the end flag given to the divided frames. The update instructing unit 51 inputs "1" to the registers corresponding to the extracted sequential Nos. The update instructing unit 51 inputs "1" to the register corresponding to the extracted end flag. At this point, re-input of "1" to the registers to which "1" is already input can be omitted.

Consequently, in the master station M, if at least the divided frames transmitted once is received among the divided frames transmitted twice, it is determined that the divided frames are received. When each of the divided frames is received at least once, it is determined that all the divided frames are received and "1" is output from the determination circuit 52. When the determination circuit 52 outputs "1", the update instructing unit 51 determines that all the divided frames are received from the slave station SL1.

When the slave station SL1 completes the data transmission processing to the master station M, the slave station SL1 transmits the TF to the slave station SL2 (ST200). Consequently, the communication processing unit 70S of the slave station SL2 transmits the cyclic data to the master station M as the data s2 (ST201 and ST202). At this point, like the slave station SL1, the slave station SL2 can repeatedly transmit the cyclic data a plurality of times and divide the cyclic data into divided frames. Thereafter, the slave station SL2 transmits the TF to the master station M (ST203).

The master station M receives the cyclic data from the slave station SL2. At this point, if the cyclic data received from the slave station SL is divided frames, the master station M receives the cyclic data according to processing same as the processing for the divided frames received from the slave station SL1. Specifically, when the master station M receives each of the divided frames, which are repeatedly transmitted a plurality of times, at least once, the master station M determines that all the divided frames are received. At this point, the determination circuit 52 outputs "1". When the determination circuit 52 outputs "1", the update instructing unit 51 determines that all the divided frames are received from the slave station SL2.

If the cyclic data received from the slave station SL2 is not divided frames, sequential Nos are not included in the cyclic data. In this case, the update instructing unit 51 determines, without using the determination circuit 52, that all the divided frames are received from the slave station SL2.

When the determination circuit 52 outputs "1" concerning the cyclic data received from all the slave stations SL1 and SL2, the update instructing unit 51 inputs "1" to a reception permission flag indicating whether all the cyclic data are received. The reception permission flag is a flag included in the master station M and indicating whether data reception processing by the data processing unit 2 is permitted. When the reception permission flag is "0", the data reception processing by the data processing unit 2 is prohibited. When the reception permission flag is "1", the data reception processing by the data processing unit 2 is permitted.

The data processing unit 2 monitors a value of the reception permission flag by performing polling. When the reception permission flag is "1", the data processing unit 2 performs the data reception processing (ST204). Consequently, the divided frames stored in the reception buffer 32 are sent to the data processing unit 2. Specifically, the communication processing unit 3M collectively DMA-transfers the data s1 and s2 received from the slave stations SL1 and SL2 to the data processing unit 2 (ST205 and ST206). When the data processing unit 2 completes the data reception processing, the data processing unit 2 inputs "0" to the reception permission flag of the communication processing unit 3M. Consequently, the data reception processing by the data processing unit 2 is prohibited. The communication processing unit 3M waits for the next divided frames transmitted from the slave station SL2.

The data processing unit 2 can perform the data reception processing at a point when the communication processing unit 3M receives all the cyclic data from the slave station SL1. In this case, the data processing unit 2 performs the data reception processing at a point when the communication processing unit 3M receives all the cyclic data from the slave station SL2.

In FIG. 16, the slave station SL1 transmits the cyclic data to the master station M. However, the slave station SL1 also transmits the cyclic data to the slave station SL2. Further, the slave station SL2 transmits the cyclic data to the master station M and the slave station SL1. The master station M transmits the cyclic data to the slave stations SL1 and SL2.

Figure 20:
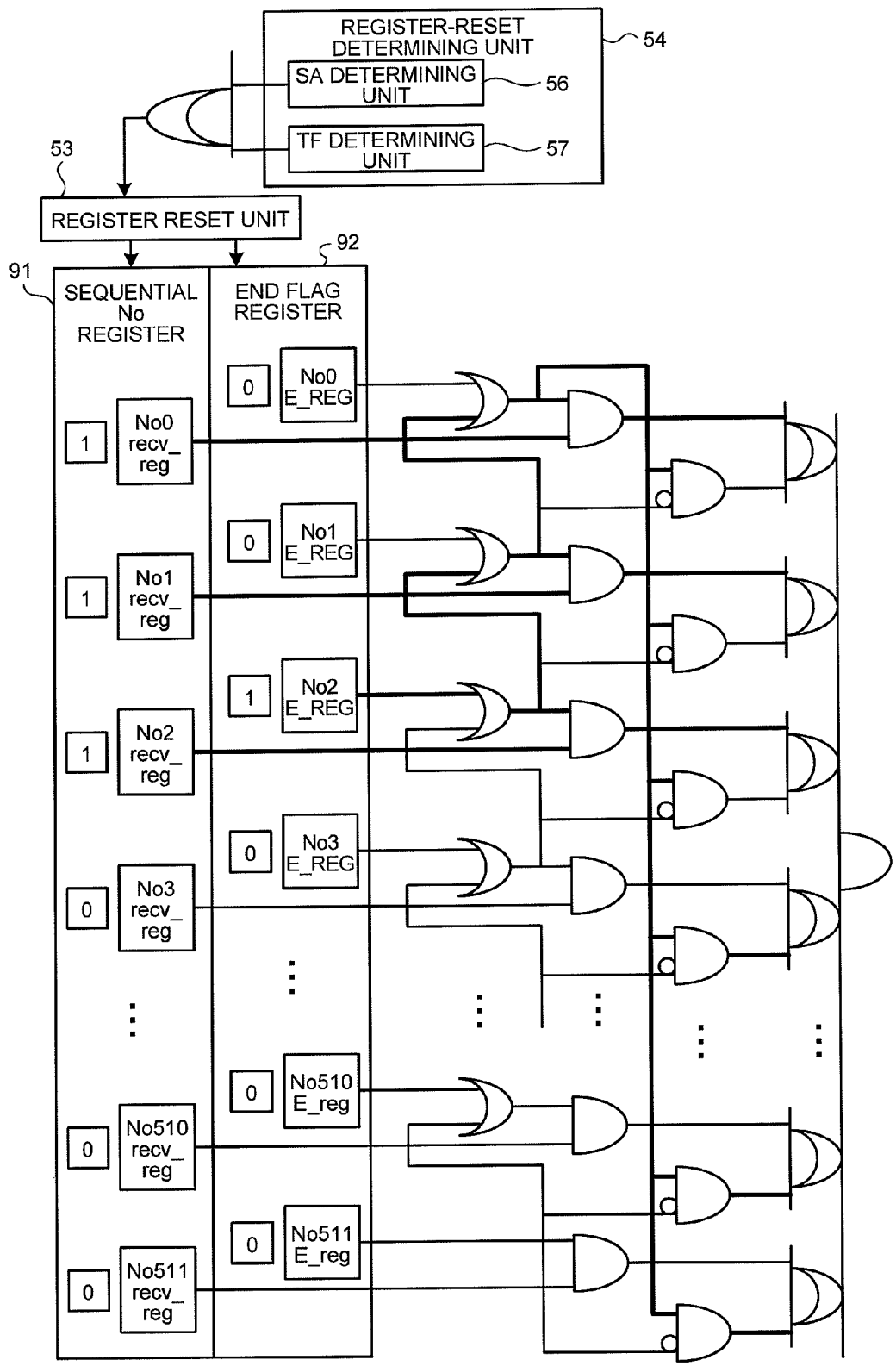
FIG. 20 is a diagram for explaining reset processing of the determination circuit.

Reset processing (reset of the sequential No register 91 and the end flag register 92) of the determination circuit 52 is explained. FIG. 20 is a diagram for explaining rest processing of the determination circuit. The communication processing unit 3M of the master station M includes a register-reset determining unit 54 in addition to the register reset unit 53 and the determination circuit 52. In the communication processing unit 3M shown in FIG. 15, illustration of the register-reset determining unit 54 is omitted.

The register-reset determining unit 54 determines whether the sequential No register 91 and the end flag register 92 are reset and sends a determination result to the register reset unit 53. The register-reset determining unit 54 includes an SA determining unit 56 and a TF determining unit 57.

The SA determining unit 56 determines, based on an SA in received cyclic data, from which station the cyclic data is received. When the SA determining unit 56 determines that divided frames are received from a station different from a station from which divided frames are received, the SA determining unit 56 sends a register reset instruction to the register reset unit 53.

The TF determining unit 57 determines, based on a destination of a received TF (token destination information), to which station the TF is transmitted. When the TF determining unit 57 determines that the TF transmitted to the own station (the master station M) is received, the TF determining unit 57 sends a register reset instruction to the register reset unit 53.

When the register reset instruction is sent from the SA determining unit 56 or the TF determining unit 57, the register reset unit 53 discards the sequential Nos and the end flag and resets the determination circuit 52. Specifically, the register reset unit 53 inputs "0" to all the registers of the sequential No register 91 and the end flag register 92.

When stations that share cyclic data with the master station M are two or more slave stations, the register-reset determining unit 54 sends a register reset instruction to the register reset unit 53 using the SA determining unit 56.

When a station that shares cyclic data with the master station M is only one slave station, the register-reset determining unit 54 sends a register reset instruction to the register reset unit 53 using the TF determining unit 57.

When transmission and reception of a TF between the stations is performed by broadcast, even if the stations that share cyclic data with the master station M are two or more slave stations, the register-reset determining unit 54 can send a register reset instruction to the register reset unit 53 using the TF determining unit 57. In this case, when the TF determining unit 57 receives a TF (a TF having an arbitrary destination), the TF determining unit 57 sends a register reset instruction to the register reset unit 53. When a TF is repeatedly transmitted and received a plurality of times between the stations, when the TF determining unit 57 receives a TF to a destination different from the last destination or a TF from a transmission source (token transmission source information) different from the last transmission source, the TF determining unit 57 sends a register reset instruction to the register reset unit 53. In other words, when the TF determining unit 57 receives a TF with destinations set to the other stations, the TF determining unit 57 sends a register reset instruction to the register reset unit 53.

In the explanation in this embodiment, the register-reset determining unit 54 includes both the SA determining unit 56 and the TF determining unit 57. However, the configuration of the register-reset determining unit 54 can be a configuration including one of the SA determining unit 56 and the TF determining unit 57.

As explained above, according to the fifth embodiment, when cyclic data shared in the data communication system 100 is transmitted to the other stations, the cyclic data is divided and sequential Nos and an end flag are given to divided frames. Therefore, a station that receives the cyclic data can determine, based on the sequential Nos and the end flag, whether all the cyclic data can be received. Consequently, even when transmission and reception of the cyclic data is repeated a plurality of times, it is possible to easily determine whether all the cyclic data can be received. Because the transmission and reception of the cyclic data is repeated a plurality of times, it is possible to reduce transmission retry for the cyclic data. Because it is possible to easily determine whether all the cyclic data can be received, it is possible to easily maintain a real time property of data sharing.

Because the determination circuit 52 is reset based on a TF and an SA give in cyclic data, it is possible to easily determine, for each of the stations, whether all the cyclic data can be received from the stations.

Sixth Embodiment.

A sixth embodiment of the present invention is explained with reference to FIGS. 21 to 25. In the past, each of stations in a data communication system issues, after transmitting data of the own station, a TF once to thereby designate the next transmission station. Specifically, in the token system in the past, as a rule, only a station that acquires a transmission right through reception of a TF performs data transmission. Therefore, multiple issuance of the TF is not permitted. This is because, if a frame of the own station is transmitted during reception of frames from the other stations, it is likely that congestion of the frames occur in a transmission line and data is lost. In this embodiment, after each of the stations transmits data of the own station, the station transmits a TF a plurality of times to thereby designate the next transmission station. In other words, in the sixth embodiment, when the TF is transmitted and received between the stations in the data communication system 100, the transmission and reception of the TF is repeated a plurality of times.

Figure 21:
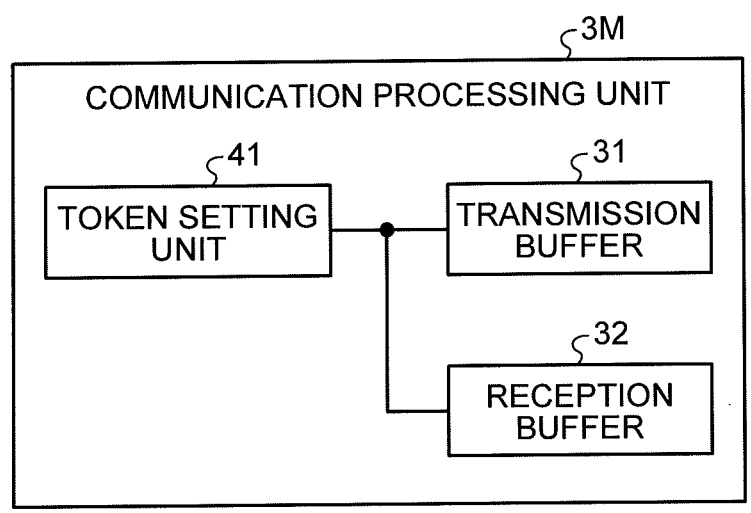
FIG. 21 is a diagram of the configuration of a communication processing unit of a master station according to a sixth embodiment.

FIG. 21 is a diagram of the configuration of a communication processing unit of a master station according to the sixth embodiment. As shown in the figure, the communication processing unit 3M of the master station M according to the sixth embodiment includes a token setting unit 41 in addition to the transmission buffer 31 and the reception buffer 32.

The token setting unit 41 according to this embodiment sets the number of times of transmission of a TF by performing processing same as the processing performed by the number-of-times-of-transmission setting unit 37 explained in the fourth embodiment. When a logical ring is formed, the token setting unit 41 instructs the slave stations SL1 and SL2 about the number of times of token transmission and sets the number of times of repeated transmission of a TF (the number of times of continuous transmission of the TF) transmitted from the master station M to the slave station SL1.

Figure 22:
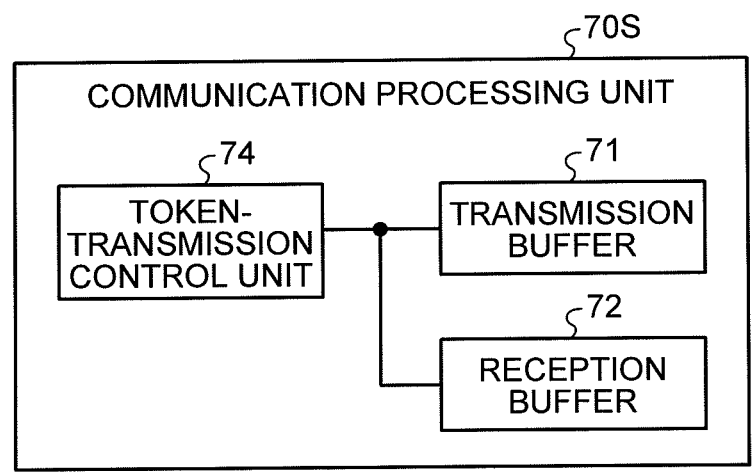
FIG. 22 is a diagram of the configuration of a communication processing unit of a slave station according to the sixth embodiment.

FIG. 22 is a diagram of the configuration of a communication processing unit of a slave station according to the sixth embodiment. Because the slave stations SL1 and SL2 have the same configuration, the configuration of the communication processing unit 70S of the slave station SL1 is explained. As shown in FIG. 22, the communication processing unit 70S of the slave station SL1 according to the sixth embodiment includes a token-transmission control unit 74, a transmission buffer 71, and a reception buffer 72.

The token-transmission control unit 74 controls, based on an instruction from the master station M (the token setting unit 41), the number of times a TF is transmitted. Specifically, the token-transmission control unit 74 of the slave station SL1 controls the number of times of transmission of the TF transmitted to the slave station SL2. The token-transmission control unit 74 of the slave station SL2 controls the number of times of transmission of the TF transmitted to the master station M. The token-transmission control unit 74 includes a timer (not shown) that measures, when a first TF is received from the master station M, elapsed time after the reception of the TF. The token-transmission control unit 74 starts data transmission when a predetermined time set in advance elapses after the first TF (first time) is received from the master station M. In other words, when the token-transmission control unit 74 receives the first TF from the master station M, the token-transmission control unit 74 waits for data transmission processing until the predetermined time set in advance elapses. When the token-transmission control unit 74 receives the first TF from the master station M, the token-transmission control unit 74 measures time after the reception of the TF and transmits data of the own station to the master station M after elapse of the predetermined time set in advance.

Figure 23:
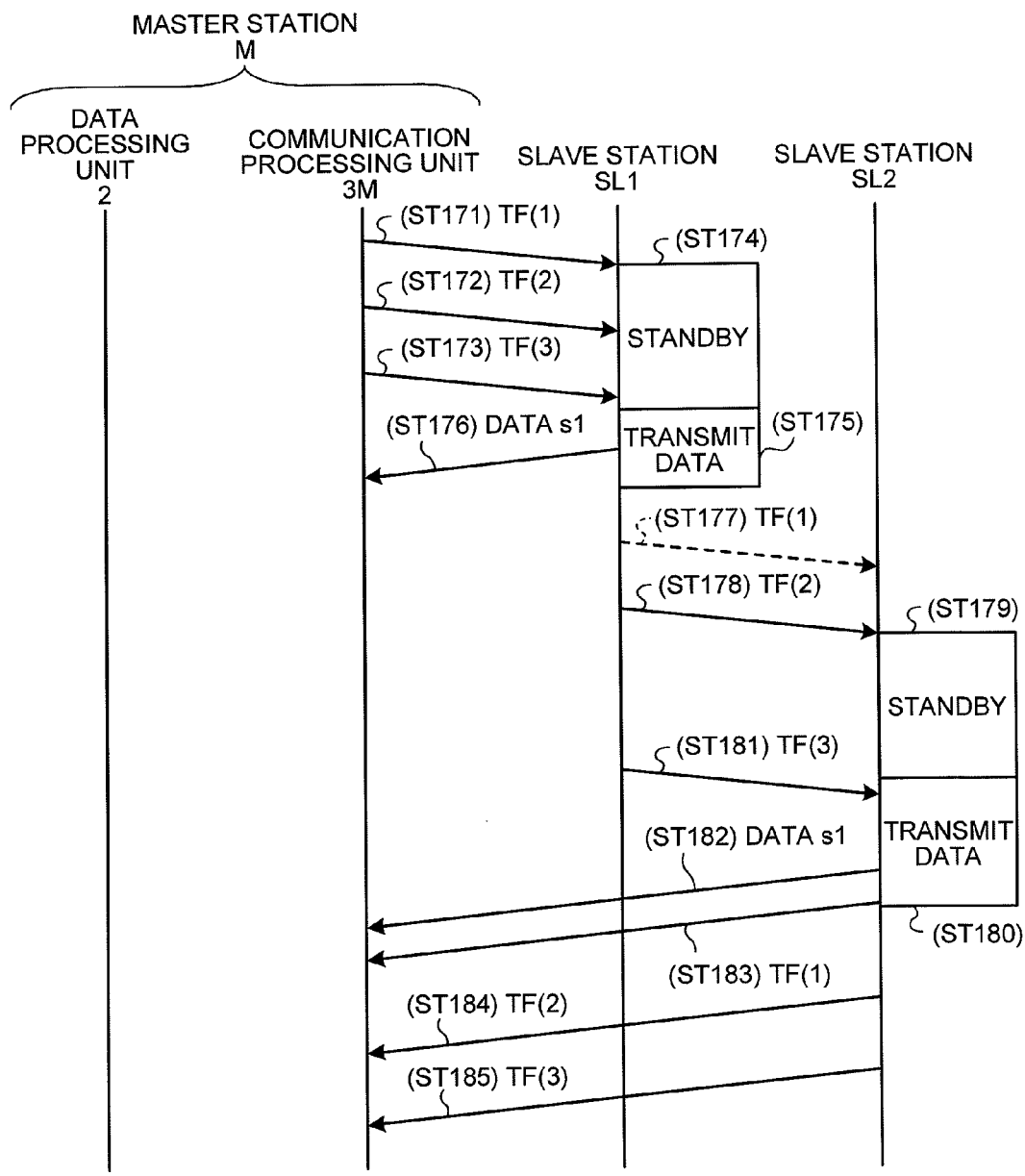
FIG. 23 is a sequence chart of a processing procedure of a data communication system according to the sixth embodiment.

FIG. 23 is a sequence chart of a processing procedure of the data communication system according to the sixth embodiment. One of characteristics of a processing procedure of the data communication system 100 according to this embodiment is that TF transmission from the master station M to the slave station SL1, TF transmission from the slave station SL1 to the slave station SL2, and the like are repeated a plurality of times. In the following explanation, the token setting unit 41 of the master station M instructs the slave stations SL1 and SL2 to transmit a token three times and sets the number of times of token transmission of a TF transmitted from the master station M to the slave station SL1 to three.

In the data communication system 100, when a logical ring is formed, the master station M instructs the slave stations SL1 and SL2 to transmit a token three times. Specifically, the master station M inserts information for designating the number of times of token transmission (three) in a setup frame transmitted to the slave stations SL1 and SL2. Consequently, the token-transmission control units 74 of the slave stations SL1 and SL2 set, based on an instruction from the master station M, the number of times of transmission of the TF to three. The token setting unit 41 of the master station M sets the number of times of token transmission to the slave station SL1 to three.

Thereafter, the communication processing unit 3M of the master station M transmits a first TF (1) to the slave station SL1 (ST171). When the slave station SL1 receives the first TF (1) from the master station M, the token-transmission control unit 74 starts the timer and puts the data transmission processing to the master station M on standby (ST174). After transmitting the first TF, the communication processing unit 3M of the master station M transmits a second TF (2) to the slave station SL1 at a predetermined interval (ST172). Further, after transmitting the second TF (2), the communication processing unit 3M of the master station M transmits a third TF (3) to the slave station SL1 at a predetermined interval (ST173). The TFs are transmitted at, for example, timing conforming to IEEE (Institute of Electrical and Electronics Engineers) 802.3u.

When a predetermined time (a standby time) set in advance elapses after the first TF (1) is received, the token-transmission control unit 74 of the slave station SL1 releases the standby of the data transmission. The token-transmission control unit 74 sets the standby time to release the standby of the data transmission after the last TF (a third TF) is received. Consequently, the communication processing unit 70S of the slave station SL1 performs data transmission to the master station M after receiving the third TF (ST175). Data from the slave station SL1 is transmitted to the communication processing unit 3M as the data s1 (ST176).

When the data transmission processing to the master station M is completed, the slave station SL1 transmits the first TF (1) to the slave station SL2 (ST177). When the slave station SL2 receives the first TF from the slave station SL1, the token-transmission control unit 74 starts the timer and puts the data transmission processing to the master station M on standby. In the following explanation, the first TF transmitted from the slave station SL1 to the slave station SL2 is lost. In this case, the slave station SL2 cannot receive the first TF (1) from the slave station SL1. After transmitting the first TF (1), the communication processing unit 70S of the slave station SL1 transmits the second TF (2) to the slave station SL2 at a predetermined interval (ST178). Consequently, the slave station SL2 receives the second TF from the slave station SL1. At this point, because the slave station SL2 has not receives the first TF, the slave station SL2 recognizes that the second TF received from the slave station SL1 is the first TF reception. The token-transmission control unit 74 of the slave station SL2 starts the timer and puts the data transmission processing to the master station M on standby (ST179).

After transmitting the second TF, the communication processing unit 70S of the slave station SL1 transmits the third TF (3) to the slave station SL2 at a predetermined interval (ST181). When the predetermined time set in advance elapses after the first TF (1) is received, the token-transmission control unit 74 of the slave station SL2 releases the standby of the data transmission. Consequently, the communication processing unit 70S of the slave station SL2 performs data transmission to the master station M (ST180). The data from the slave station SL1 is transmitted to the communication processing unit 3M as the data s1 (ST182). When the data transmission processing to the master station M is completed, the slave station SL2 transmits the first TF (1), the second TF (2), and the third TF (3) to the master station M (ST183, ST184, and ST185).

In some case, a TF in a transmission line is delayed. Therefore, in some case, the slave station SL2 receives a TF from the slave station ST1 while performing data transmission to the master station M. For example, in the data transmission to the master station M (ST180), in some case, the third TF (3) from the slave station SL1 reaches the slave station SL2. In this case, the token-transmission control unit 74 of the slave station SL2 notifies the master station M that the slave station SL2 receives the TF during the data transmission. In other words, when an own station receives a TF to the own station at timing when the own station is performing data transmission, the token-transmission control unit 74 notifies the master station M that the own station receives the TF during the data transmission.

In the data communication system 100, in some case, the switching hub 20 such as a switching hub in an Ethernet (registered trademark) is present on the transmission line. Therefore, even if the stations transmit a TF at a minimum frame GAP (an inter-transmission interval), the switching hub 20 cannot always guarantee that frame transmission is performed at a reception interval of reception of the TF. Therefore, in this embodiment, if the slave stations SL1 and SL2 receive the TF during data transmission, the slave stations SL1 and SL2 notify the master station M that the TF is received during the data transmission. Consequently, the token setting unit 41 of the master station M resets, in the slave station SL2, a standby time until data of the own station is transmitted after the first TF is received. Specifically, the token setting unit 41 of the master station M resets, in the slave station SL2, the standby time until data of the own station is transmitted after the first TF is received such that the standby time is longer than the present setting.

In the explanation of this embodiment, the master station M resets the waiting time of the slave station SL2. However, the slave station SL2 itself can reset the waiting time. The token-transmission control unit 74 of the slave station SL2 can change, based on a received TF and a TF that cannot be received, the standby time. In this case, information indicating how-manieth TFs the TFs are is given (added) to the TFs in advance. For example, when a TF is repeatedly transmitted five times, sequential Nos are given to first to fifth TFs. Specifically, "1" is given to the first TF as a sequential No, "2" is given to the second TF as a sequential No, and "3" is given to the third TF as a sequential No. "4" is given to the fourth TF as a sequential No and "5" is given to the fifth TF as a sequential No.

When a standby time designated by the master station M (a designated standby time) is t, the token-transmission control unit 74 calculates a new standby time T according to Formula (1). X in the formula represents the number of times of repeated transmission of a TF and Sn represents a sequential No of a TF received first.

$$T = t \times (X - Sn)/(X-1) \qquad (1)$$

Therefore, when a sequential No of a TF received first is "1", the token-transmission control unit 74 waits for transmission processing for data for the standby time t designated by the master station M. When the sequential No of the TF received first is "2", the token-transmission control unit 74 waits for the transmission processing for data for $(3/4)t$. When the sequential No of the TF received first is "3", the token-transmission control unit 74 waits for the transmission processing for data for $(2/4)t$. When the sequential No of the TF received first is "4", the token-transmission control unit 74 waits for the transmission processing for data for $(1/4)t$. When the sequential No of the TF received first is "5", the token-transmission control unit 74 performs the transmission processing for data without a standby time. The master station M can instruct the slave stations SL1 and SL2 about the resetting of the standby time.

The slave station SL1 has a configuration same as that of the slave station SL2. Therefore, like the token-transmission control unit 74 of the slave station SL2, when the token-transmission control unit 74 of the slave station SL1 receives a TF to the own station at timing when the own station is performing data transmission, the token-transmission control unit 74 notifies the master station M that the TF is received during the data transmission.

The notification from the slave station SL2 to the master station M concerning the reception of the TF during the data transmission can be performed after the slave station SL2 performs data transmission to the master station M (ST181) and before the slave station SL2 transmits the TF (1) (before ST183) or can be performed during data transmission when the slave station SL2 receives a TF from the slave station SL1 next.

In the explanation in this embodiment, the slave stations SL1 and SL2 start data transmission when the predetermined time set in advance elapses after the slave stations SL1 and SL2 receive the first TF. However, like the slave stations SL1 and SL2, the master station M can start data transmission when the predetermined time set in advance elapses after the master station M receives the first TF. When the master station M receives TFs from the slave stations SL1 and SL2 while performing data transmission, the token setting unit 41 of the master station M can reset, in the own station, a standby time until data of the own station is transmitted after the first TF is received.

In the explanation in this embodiment, the stations repeatedly transmit a TF three times. However, the number of times of repeated transmission of the TF by the stations can be two or can be four. The number of times of repeated transmission of the TF can be a number different for each of the stations.

Figure 24:
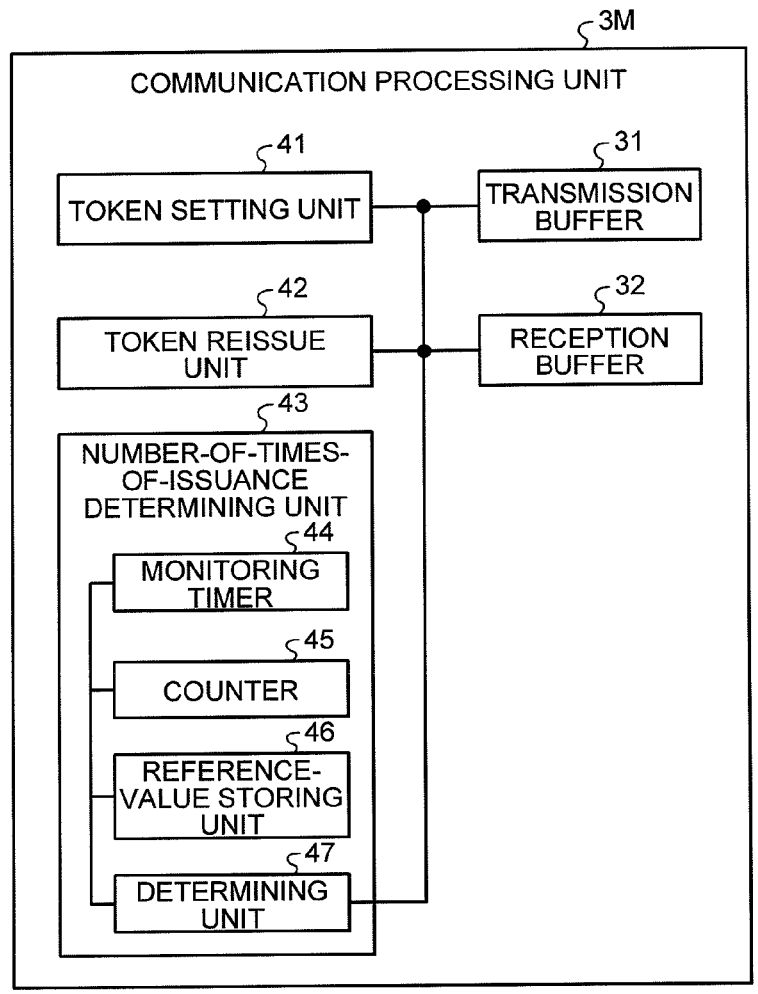
FIG. 24 is a diagram of the configuration of a communication processing unit of a master station that changes the number of times of repeated transmission of a TF.

The master station M can change, based on the number of times of loss of the TF, the number of times of repeated transmission of the TF. FIG. 24 is a diagram of the configuration of the communication processing unit of the master station that changes the number of times of repeated transmission of the TF. The communication processing unit 3M of the master station M that changes the number of times of repeated transmission of the TF includes a token reissue unit 42 and a number-of-times-of-issuance determining unit 43 in addition to the transmission buffer 31, the reception buffer 32, the token setting unit 41.

The token reissue unit 42 has a function of reissuing a TF when the TF is lost. When a TF is not issued for a predetermined time in the data communication system 100, the token reissue unit 42 reissues the TF determining that the TF is lost.

The number-of-times-of-issuance determining unit 43 includes a monitoring timer 44, a counter 45, a reference-value storing unit 46, and a determining unit 47 and determines whether the number of times a TF is issued exceeds a predetermined value. The monitoring timer 44 measures time. The counter 45 counts the number of times of reissuance of the TF by the token reissue unit 42. The reference-value storing unit 46 has stored therein a reference value used in determining whether the number of times of repeated transmission of the TF is changed. The determining unit 47 calculates, based on the time measured by the monitoring timer 44 and the number of times of reissuance of the TF counted by the counter 45, the number of times of reissuance of the TF per unit time. The determining unit 47 determines whether the calculated number of times of reissuance of the TF per unit time exceeds the reference value stored in the reference-value storing unit 46. When the number of times of reissuance of the TF exceeds the reference value stored in the reference-value storing unit 46, the determining unit 47 instructs the token setting unit 41 to reset the number of times of transmission of the TF.

The token setting unit 41 increases a currently-set number of times of transmission of the TF according to an instruction from the determining unit 47. For example, the token setting unit 41 sets the number of times of transmission of the TF to one as an initial value and increases the number of times of transmission of the TF to two and three every time the token setting unit 41 receives an instruction for change of the number of times of transmission of the TF from the determining unit 47.

The reference-value storing unit 46 can store a reference value for each set number of times transmission of the TF. For example, the reference-value storing unit 46 stores a plurality of reference values such as a reference value used when the set number of times of transmission of the TF is one and a reference value used when the set number of times of transmission of the TF is two. The determining unit 47 acquires the currently-set number of times of transmission of the TF from the token setting unit 41 and compares the currently-set number of times of transmission of the TF and a reference value corresponding to the number of times of transmission of the TF to thereby determine whether the number of times of transmission of the TF is increased.

When the calculated number of times of reissuance of the TF per unit time is smaller than the predetermined reference value, the determining unit 47 can instruct the token setting unit 41 to reduce the currently-set number of times of transmission of the TF. The determining unit 47 can instruct, based on the calculated number of times of reissuance of the TF per unit time, the token setting unit 41 about the number of times of transmission of the TF. The determining unit 47 can instruct, based on the calculated number of times of reissuance of the TF per unit time, the token setting unit 41 about the number of times of transmission of the TF.

As explained above, in the data communication system 100, even when there is a change in a transmission environment of a frame (presence or absence of occurrence of noise), it is possible to adjust the number of times of transmission of the TF according to a change in the transmission environment (the number of times of reissuance of the TF per unit time). Consequently, when noise does not occur on the transmission line, it is possible to reduce the number of times of transmission of the TF to give priority to high-speed communication. When noise occurs on the transmission line, it is possible to increase the number of times of transmission of the TF. Therefore, it is possible to minimize a degree of performance deterioration.

Figure 25:
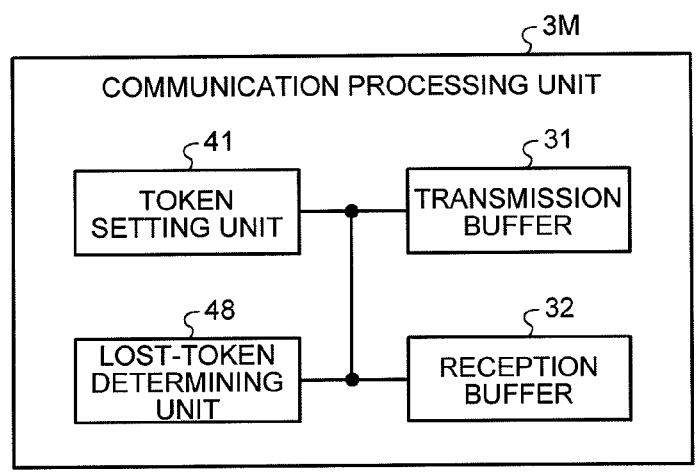
FIG. 25 is a diagram of the configuration of the communication processing unit of the master station that changes, for each of stations, the number of times of repeated transmission of the TF.

The communication processing unit 3M of the master station M can change, based on from which station a lost TF is issued, for each of the stations, the number of times of repeated transmission of the TF. FIG. 25 is a diagram of the configuration of the communication processing unit of the master station that changes, for each of the stations, the number of times of repeated transmission of the TF. The communication processing unit 3M of the master station M that changes, for each of the stations, the number of times of repeated transmission of the TF includes a lost-token determining unit 48 in addition to the transmission buffer 31, the reception buffer 32, and the token setting unit 41.

The lost-token determining unit 48 has a function of checking to which station a TF is circulated to thereby determine a TF issued by which station is lost. The lost-token determining unit 48 notifies the token setting unit 41 of a station (the slave station SL1 or SL2 or the master station M) that issues the lost TF. Consequently, the token setting unit 41 changes, concerning the station (the slave station SL1, the slave station SL2, or the master station M) that issues the lost TF, the number of times of repeated transmission of the TF. At this point, the token setting unit 41 sets, in any one of the slave stations SL1 and SL2 and the master station M, the number of times of repetition repeated transmission of the TF corresponding to the number of times of loss of the TF.

In the data communication system 100, the slave stations SL1 and SL2 are caused to transmit TFs in broadcast. SAs (source addresses) indicating issue sources of the TFs are included in the TFs. Consequently, the TFs having the SAs issued from the slave stations SL1 and SL2 are transmitted to the lost-token determining unit 48 of the master station M. The lost-token determining unit 48 can determine, by checking the SAs of the TFs, which positions the TFs circulate and in which position the TFs are lost.

In the explanation in this embodiment, the communication processing unit 3M includes the token reissue unit 42 and the number-of-times-of-issuance determining unit 43 or the communication processing unit 3M includes the lost-token determining unit 48. However, the communication processing unit 3M can include the token reissue unit 42, the number-of-times-of-issuance determining unit 43, and the lost-token determining unit 48.

Consequently, even when a noise source is present in a local section as shown in FIG. 12, it is possible to set, for each of the stations, repeated transmission of a TF corresponding to the noise source. Therefore, it is possible to minimize performance deterioration due to the repeated transmission of the TF.

As explained above, according to the sixth embodiment, it is possible to prevent a loss of a TF while preventing collision of the TF and data. Therefore, it is possible to prevent recovery of a token and efficiently perform data communication.

The master station M sets, for each of the stations, the number of times of transmission of a TF. Therefore, it is possible to perform efficient data communication corresponding to the stations. The master station M sets, based on the number of reissued TFs and the number of lost TFs, the number of times of transmission of the TF. Therefore, it is possible to perform efficient data communication corresponding to a noise source.

The data communication system 100 can perform data communication processing by variously combining the kinds of data communication processing according to the first to sixth embodiments and the data communication processing in the past explained with reference to FIG. 4 in the first embodiment.

For example, the data communication system 100 can perform the data communication processing by combining the data communication processing explained in the second embodiment and the data communication processing explained in the fourth embodiment. In this case, after setting the number of times of data transmission (ST149 shown in FIG. 11), the data communication system 100 transmits the data m to the slave stations SL1 and SL2 in broadcast (ST79 and ST80 shown in FIG. 6). When the communication processing unit 3M completes the data transmission processing to the slave stations SL1 and SL2, the communication processing unit 3M transmits the TF to the slave station SL1 (ST150 shown in FIG. 11).

The data communication system 100 can perform the data communication processing by combining the data communication processing explained in the first embodiment and the data communication processing in the past explained in the fourth embodiment. In this case, in the data communication system 100, after the communication processing unit 3M receives the data s1 and s2 from the slave stations SL1 and SL2, the processing at ST38 to ST43 shown in FIG. 4 (the F/W processing of the master station M) and the processing at ST148 to ST158 shown in FIG. 11 are performed.

The processing at ST109 (the next determination processing) of the data communication processing explained with reference to FIG. 7 in the third embodiment can be performed based on the statistic information of reception states explained in the fourth embodiment. In this case, for example, if an occurrence ratio of noise is equal to or larger than a predetermined value, the communication processing unit 3M selects the data communication processing shown in FIG. 3. If the occurrence ratio of noise is smaller than the predetermined value, the communication processing unit 3M selects the data communication processing shown in FIG. 4. This makes it possible to perform appropriate recovery processing corresponding to a reception state of the data s1 and s2. Therefore, it is possible to efficiently perform data communication.

INDUSTRIAL APPLICABILITY

As explained above, the data communication system and the data communication apparatus according to the present invention are suitable for data communication between the master station and the slave stations.

The invention claimed is:

1. A data communication system that performs data communication between a master station and a plurality of slave stations in a token passing system employing an Ethernet, wherein the master station includes:
   a communication processing unit that performs, as first data transmission and reception processing, data transmission and reception between the master station and the slave stations performed by circulating a token frame between the master station and the slave stations; and a data transmission and reception processing unit that is connected to an arithmetic processing device and performs, as second data transmission and reception processing, data transmission and reception performed between the arithmetic processing device and the communication processing unit, the arithmetic processing device subjecting data transmitted from the slave station to arithmetic processing and generating data transmitted to the slave station, wherein the communication processing unit performs, as a third data transmission and reception processing, data transmission and reception performed between the communication processing unit and the data transmission and reception processing unit, and wherein, when data reception processing for circulating the token frame between the master station and the stave stations and receiving the data from the slave stations in the first data transmission and reception processing is subjected to a retry processing, in the retry processing, the communication processing unit circulates the token frame between the master station and the slave stations and receives the data from the slave stations without performing the third data transmission and reception processing, and performs the third data transmission and reception processing after the retry processing.

2. The data communication system according to claim 1, wherein the communication processing unit retransmits data, which is transmitted to the slave stations when the first data transmission and reception processing is performed, to the slave stations before performing the retry processing.

3. The data communication system according to claim 1, wherein the communication processing unit selects, based on a reception state of the data transmitted from the slave stations, one of the third data transmission and reception processing and the retry processing as processing after the first data transmission and reception processing or the retry processing is performed and executes the processing.

4. The data communication system according to claim 1, wherein the communication processing unit sets, based on a reception state of the data transmitted from the slave stations, for each of the slave stations, a number of times of data transmission requested to the slave stations and requests the set number of times of data transmission from the slave stations using the token frame.

5. The data communication system according to claim 1, wherein the communication processing unit repeats, after performing the first data transmission and reception processing, the retry processing by a number of times set in advance without performing the third data transmission and reception processing.

6. The data communication system according to claim 3, wherein the communication processing unit selects, based on statistic information of the reception state calculated using a history of the reception state, one of the third data transmission and reception processing and the retry processing and executes the processing.

7. The data communication system according to claim 4, wherein the communication processing unit sets, based on a statistic information of the reception state calculated using a history of the reception state, the number of times of data transmission requested to the slave stations.

8. The data communication system according to claim 1, wherein the communication processing unit aggregates data received from all the slave stations by performing the data reception processing and performs the third data transmission and reception processing.

9. The data communication system according to claim 4, wherein the slave station repeats, when the token frame is received, data transmission to the master station by a number of times designated in advance in the master station.

10. The data communication system according to claim 1, wherein
the slave station divides data shared with the master station and transmitted from the slave station to the master station into a plurality of frames, gives sequential numbers to the divided frames, gives last information indicating a last frame to a last frame among the divided frames, and transmits the frames to the master station,
the communication processing unit includes a determining unit that determines, based on the sequential number and the last information, whether all data are received from the slave station, and
when the determining unit determines that all the data are received from the slave station, the communication processing unit performs the third data transmission and reception processing.

11. The data communication system according to claim 10, wherein
a frame transmitted to the master station by the slave station includes frame transmission source information indicating a transmission source of the frame, and
the communication processing unit determines, based on the frame transmission source information in the frame received from the slave station, from which slave station the frame is received and, when the communication processing unit determines that the frame is received from a next slave station different from a last slave station, resets the determining unit and causes the determining unit to determine whether all data are received from the next slave station.

12. The data communication system according to claim 10, wherein
the token frame includes token destination information indicating a destination of the token frame, and
the communication processing unit determines, based on the token destination information, the destination of the token frame and, when the communication processing unit determines that a token frame to the own station is received, resets the determining unit and causes the determining unit to determine whether all data are received from the next slave station.

13. The data communication system according to claim 10, wherein
the token frame includes transmission source information indicating a transmission source of the token frame, and
the communication processing unit determines, based on the token transmission source information, from which slave station the token frame is transmitted and, when the communication processing unit determines that the token frame is received from a next slave station different from a last slave station, resets the determining unit and causes the determining unit to determine whether all data are received from the next slave station.

14. A data communication system that performs data communication between a master station and a plurality of slave stations in a token passing system employing an Ethernet, wherein
the master station includes:
a communication processing unit that performs, as first data transmission and reception processing, data transmission and reception between the master station and the slave stations performed by circulating a token frame between the master station and the slave stations; and a data transmission and reception processing unit that is connected to an arithmetic processing device and performs, as second data transmission and reception processing, data transmission and reception performed between the arithmetic processing device and the communication processing unit, the arithmetic processing device subjecting data transmitted from the slave station to arithmetic processing and generating data transmitted to the slave station, wherein the communication processing unit performs, as third data transmission and reception processing, data transmission and reception performed between the communication processing unit and the data transmission and reception processing unit, and wherein, when the first data transmission and reception processing is performed, the communication processing unit repeatedly transmits the token frame to a data transmission and reception target slave station a plurality of times.

15. The data communication system according to claim 14, wherein the communication processing unit sets, for each of the slave stations, a number of times of data transmission requested to the slave stations and requests the set number of times of data transmission of the token frame from the slave stations.

16. The data communication system according to claim 15, wherein the communication processing unit performs, when the token frame is lost, reissuance of the token frame and sets, based on a number of reissued token frames, for each of the slave stations, a number of times of transmission of a token frame requested to the slave stations.

17. The data communication system according to claim 15, wherein the communication processing unit detects a lost token frame and sets, based on a number of lost token frames, for each of the slave stations, a number of times of transmission of a token frame requested to the slave stations.

18. The data communication system according to claim 15, wherein the slave station repeats, when the token frame is received, transmission of the token frame to the master station or the other slave stations by a number of times designated in advance in the master station.

19. A data communication apparatus serving as a master station that performs data communication between the data communication apparatus and a plurality of slave stations in a token passing system employing an Ethernet, the data communication apparatus comprising:

a communication processing unit that performs, as first data transmission and reception processing, data transmission and reception between the master station and the slave stations performed by circulating a token frame between the master station and the slave stations; and a data transmission and reception processing unit that is connected to an arithmetic processing device and performs, as second data transmission and reception processing, data transmission and reception performed between the arithmetic processing device and the communication processing unit, the arithmetic processing device subjecting data transmitted from the slave station to arithmetic processing and generating data transmitted to the slave station, wherein the communication processing unit performs, as third data transmission and reception processing, data transmission and reception performed between the communication processing unit and the data transmission and reception processing unit, and wherein, when data reception processing for circulating the token frame between the master station and the slave stations and receiving the data from the slave stations in the first data transmission and reception processing is subjected to a retry processing, in the retry processing, the communication processing unit circulates the token frame between the master station and the slave stations and receives the data from the slave stations without performing the third data transmission and reception processing, and performs the third data transmission and reception processing after the retry processing.

20. A data communication apparatus serving as a master station that performs data communication between the data communication apparatus and a plurality of slave stations in a token passing system employing an Ethernet, the data communication apparatus comprising:

a communication processing unit that performs, as first data transmission and reception processing, data transmission and reception between the master station and the slave stations performed by circulating a token frame between the master station and the slave stations; and a data transmission and reception processing unit that is connected to an arithmetic processing device and performs, as second data transmission and reception processing, data transmission and reception performed between the arithmetic processing device and the communication processing unit, the arithmetic processing device subjecting data transmitted from the slave station to arithmetic processing and generating data transmitted to the slave station, wherein the communication processing unit performs, as third data transmission and reception processing, data transmission and reception performed between the communication processing unit and the data transmission and reception processing unit, and wherein, when the first data transmission and reception processing is performed, in a recovery processing, the communication processing unit repeatedly transmits the token frame to a data transmission and reception target slave station a plurality of times.

* * * * *